United States Patent
Liu et al.

(10) Patent No.: US 9,124,873 B2
(45) Date of Patent: *Sep. 1, 2015

(54) SYSTEM AND METHOD FOR FINDING CORRESPONDENCE BETWEEN CAMERAS IN A THREE-DIMENSIONAL VISION SYSTEM

(71) Applicant: Cognex Corporation, Natick, MA (US)

(72) Inventors: Lifeng Liu, Arlington, MA (US); Aaron S. Wallack, Natick, MA (US); Cyril C. Marrion, Jr., Acton, MA (US); David J. Michael, Wayland, MA (US)

(73) Assignee: Cognex Corporation, Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/062,718

(22) Filed: Oct. 24, 2013

(65) Prior Publication Data

US 2014/0118500 A1 May 1, 2014

Related U.S. Application Data

(63) Continuation-in-part of application No. 12/962,918, filed on Dec. 8, 2010, now Pat. No. 8,600,192.

(51) Int. Cl.
*G06K 9/00* (2006.01)
*G06K 9/36* (2006.01)
(Continued)

(52) U.S. Cl.
CPC ............ *H04N 13/0203* (2013.01); *G06K 9/209* (2013.01); *G06T 7/0018* (2013.01);
(Continued)

(58) Field of Classification Search
CPC .. H04N 13/0203; G06K 9/209; G06T 7/0018; G06T 7/0046; G06T 2207/30208; G06T 2007/10012; G06T 2207/10056

USPC ........ 382/154, 190, 285, 291, 295, 296, 305, 382/312; 348/46, 47; 345/419, 653, 654, 345/662; 700/245, 259

See application file for complete search history.

(56) References Cited

U.S. PATENT DOCUMENTS 5,257,203 A 10/1993 Riley et al.
5,579,444 A * 11/1996 Dalziel et al. ................ 700/259
(Continued)

FOREIGN PATENT DOCUMENTS

EP 0265302 9/1987
EP 0341122 4/1989
(Continued)

OTHER PUBLICATIONS

Caron, et al., "3D Model Based Pose Estimation for Omnidirectional Stereovision", "The 2009 IEEE/RSJ International Conference on Intelligent Robots and Systems", Apr. 2009, pp. 5228-5233, Publisher: IEEE, Published in: US.

(Continued)

*Primary Examiner* — Kanjibhai Patel

(74) *Attorney, Agent, or Firm* — Loginov & Associates PLLC

(57) ABSTRACT

This invention provides a system and method for determining correspondence between camera assemblies in a 3D vision system implementation having a plurality of cameras arranged at different orientations with respect to a scene involving microscopic and near microscopic objects under manufacture moved by a manipulator, so as to acquire contemporaneous images of a runtime object and determine the pose of the object for the purpose of guiding manipulator motion. At least one of the camera assemblies includes a non-perspective lens. The searched 2D object features of the acquired non-perspective image, corresponding to trained object features in the non-perspective camera assembly can be combined with the searched 2D object features in images of other camera assemblies, based on their trained object features to generate a set of 3D features and thereby determine a 3D pose of the object.

16 Claims, 11 Drawing Sheets

(51) Int. Cl.
*H04N 13/02* (2006.01)
*G06K 9/20* (2006.01)
*G06T 7/00* (2006.01)

(52) U.S. Cl.
CPC ..... *G06T 7/0046* (2013.01); *G06T 2207/10012* (2013.01); *G06T 2207/10056* (2013.01); *G06T 2207/30164* (2013.01); *G06T 2207/30208* (2013.01)

(56) References Cited

U.S. PATENT DOCUMENTS

| | | | |
|---|---|---|---|
| 5,654,800 | A | 8/1997 | Svetkoff et al. |
| 5,742,037 | A | 4/1998 | Scola et al. |
| 5,859,924 | A | 1/1999 | Liu et al. |
| 5,918,196 | A | 6/1999 | Jacobson et al. |
| 5,960,125 | A | 9/1999 | Michael et al. |
| 5,978,080 | A | 11/1999 | Michael et al. |
| 5,978,502 | A | 11/1999 | Ohashi |
| 5,978,521 | A | 11/1999 | Wallack et al. |
| 6,005,965 | A | 12/1999 | Tsuda et al. |
| 6,075,881 | A | 6/2000 | Foster et al. |
| 6,078,701 | A | 6/2000 | Hsu et al. |
| 6,151,406 | A | 11/2000 | Chang et al. |
| 6,166,811 | A | 12/2000 | Long et al. |
| 6,178,392 | B1 | 1/2001 | Mack et al. |
| 6,219,099 | B1 | 4/2001 | Johnson et al. |
| 6,301,396 | B1 | 10/2001 | Michael et al. |
| 6,357,588 | B1 | 3/2002 | Room et al. |
| 6,359,617 | B1 | 3/2002 | Xiong |
| 6,421,458 | B2 | 7/2002 | Michael et al. |
| 6,476,803 | B1 | 11/2002 | Zhang et al. |
| 6,516,099 | B1 | 2/2003 | Davison et al. |
| 6,539,107 | B1 | 3/2003 | Michael et al. |
| 6,553,138 | B2 | 4/2003 | Rozin |
| 6,594,623 | B1 | 7/2003 | Wang et al. |
| 6,624,899 | B1 | 9/2003 | Clark |
| 6,639,624 | B1 | 10/2003 | Bachelder et al. |
| 6,658,145 | B1 | 12/2003 | Silver et al. |
| 6,681,151 | B1 | 1/2004 | Weinzimmer et al. |
| 6,718,074 | B1 | 4/2004 | Dutta-Choudhury et al. |
| 6,728,582 | B1 | 4/2004 | Wallack |
| 6,748,104 | B1 | 6/2004 | Bachelder et al. |
| 6,751,338 | B1 | 6/2004 | Wallack |
| 6,751,361 | B1 | 6/2004 | Wagman |
| 6,771,808 | B1 | 8/2004 | Wallack |
| 6,798,925 | B1 | 9/2004 | Wagman |
| 6,850,646 | B1 | 2/2005 | Silver |
| 6,856,698 | B1 | 2/2005 | Silver et al. |
| 6,903,177 | B2 | 6/2005 | Seo et al. |
| 7,027,642 | B2 | 4/2006 | Rubbert et al. |
| 7,068,825 | B2 | 6/2006 | Rubbert et al. |
| 7,158,677 | B2 | 1/2007 | Wenzel et al. |
| 7,305,121 | B2 | 12/2007 | Kaufmann et al. |
| 7,360,410 | B2 | 4/2008 | Steinbichler et al. |
| 7,362,969 | B2 | 4/2008 | Aliaga et al. |
| 7,414,732 | B2 | 8/2008 | Maidhof et al. |
| 7,421,097 | B2 | 9/2008 | Hamza et al. |
| 7,609,893 | B2 | 10/2009 | Luo et al. |
| 7,680,323 | B1 | 3/2010 | Nichani |
| 7,693,348 | B2 | 4/2010 | Zavadsky et al. |
| 7,775,439 | B2 | 8/2010 | Kimber et al. |
| 7,777,300 | B2 | 8/2010 | Tews et al. |
| 7,907,774 | B2 | 3/2011 | Parr et al. |
| 7,916,935 | B2 * | 3/2011 | Larsen et al. .............. 382/154 |
| 8,095,237 | B2 | 1/2012 | Habibi et al. |
| 8,126,260 | B2 | 2/2012 | Wallack et al. |
| 8,224,108 | B2 | 7/2012 | Steinberg et al. |
| 8,254,695 | B1 | 8/2012 | Silver et al. |
| 8,260,059 | B2 | 9/2012 | Hofhauser et al. |
| 8,379,014 | B2 | 2/2013 | Wiedemann et al. |
| 8,442,304 | B2 * | 5/2013 | Marrion et al. .............. 382/154 |
| 2004/0234118 | A1 | 11/2004 | Astrom et al. |
| 2005/0089214 | A1 | 4/2005 | Rubbert et al. |
| 2007/0081714 | A1 | 4/2007 | Wallack et al. |
| 2007/0197911 | A1 | 8/2007 | Kaiser et al. |
| 2008/0075328 | A1 | 3/2008 | Sciammarella |
| 2008/0298672 | A1 | 12/2008 | Wallack et al. |
| 2010/0166294 | A1 | 7/2010 | Marrion et al. |

FOREIGN PATENT DOCUMENTS

| | | |
|---|---|---|
| JP | 8-201021 | 9/1996 |
| JP | 2004-504077 | 2/2004 |
| JP | 2004-239747 | 8/2004 |
| JP | 2005-534026 | 11/2005 |
| WO | WO-9511491 | 4/1995 |
| WO | WO-2008147355 | 12/2008 |
| WO | WO-2010077524 | 7/2010 |

OTHER PUBLICATIONS

Rova, "Affine Multi-View Modelling for Close Range Object Measurement", 2010, pp. 1-283, Published in: UK.

Suetens, et al., "Computational Strategies for Object Recognition", "Computing Surveys", Mar. 1992, pp. 5-61, vol. 24, No. 1, Publisher: ACM.

Kovalsky, et al., "Decoupled Linear Estimation of Affine Geometric Deformations and Nonlinear Intensity Transformations of Images", "Transactions on Pattern Analysis and Machine Intelligence", May 2010, pp. 940-946, vol. 32, No. 5, Publisher: IEEE.

Faugeras, et al., "The Representation, Recognition and Locating of 3-D Objects", "The International Journal of Robotics Research", 1986, pp. 27-52, vol. 5, No. 3, Publisher: Masssachusetts Institute of Technology, Published in: Massachusetts.

Li, et al., "Geometric Integration of Aerial and High-Resolution Satellite Imagery and Application in Shoreline Mapping", "Marine Geodesy", Jul. 2008, pp. 143-159, vol. 31, No. 3, Publisher: Taylor & Francis Group, LLC.

Manmatha, "Image Matching Under Affine Deformations", 1993, pp. 106-110, Publisher: IEEE.

Basri, et al., "Localization Using Combinations of Model Views", "Computer Vision 1993", Feb. 1993, pp. 226-230, Publisher: IEEE, Published in: US.

Chin, et al., "Model-Based Recognition in Robot Vision", "Computing Surveys", Mar. 1986, pp. 68-108, vol. 18, No. 1, Publisher: ACM, Published in: US.

Jost, et al., "A Multi-Resolution ICP With Heuristic Closest Point Search for Fast and Robust 3D Registration of Range Images", "Fourth International Conference on 3-D Digital Imaging and Modeling", Oct. 6, 2003, pp. 427-433, Publisher: IEEE.

Wallack, et al., "Object Recognition and Localization From Scanning Beam Sensors", "International Conference on Robotics and Automation", 1995, pp. 247-254, Publisher: IEEE, Published in: US.

Lepetit, et al., "Point Matching as a Classification Problem for Fast and Robust Object Pose Estimation", Jul. 2004, pp. 1-7, Publisher: IEEE.

P. Wunsch et al, "Real-Time Pose Estimation of 3-D Objects from Camera Images Using Neural Networks", Apr. 2007, pp. 3232-3237, Publisher: IEEE, Published in: Albuquerque.

Lavalee, et al, "Recovering the Position and Orientation of Free-Form Objects from Image Contours Using 3D Distance Maps", "Transactions on Pattern Analysis and Machine Intelligence", Apr. 17, 1995, pp. 378-382, vol. 17, No. 4, Publisher: IEEE, Published in: New York.

P. Wunsch et al, "Registration of CAD-Models to Images by Iterative Inverse Perspective Matching", 1996, pp. 78-83, Publisher: IEEE, Published in: Wessling, DE.

Klein, et al., "Robust Visual Tracking for Non-Instrumented Augmented Reality", "Proceedings of the Second IEEE and ACM International Symposium on Mixed and Augmented Reality", May 2003, pp. 1-10, Publisher: IEEE, Published in: US.

O.D.Faugeras et al, "The Representation, Recognition, and Locating of 3-D Objects", 1986, pp. 27-52, vol. 5, No. 3, Publisher: Massachusetts Institute of Technology, Published in: Pittsburgh, US.

Faugeras, "Three-Dimensional Computer Vision—A Geometric Viewpoint", 1993, pp. 211-213; 483-534, Publisher: MIT Press.

(56) References Cited

OTHER PUBLICATIONS

Besl, et al., "Three-Dimensional Object Recognition", "Computing Surveys", Mar. 1985, pp. 75-145, vol. 17, No. 1, Publisher: ACM, Published in: US.

Godin, et al., "Three-Dimensional Registration Using Range and Intensity Information", "Videometrics", 1994, pp. 279-290, vol. 2350, No. III, Publisher: SPIE, Published in: CA.

Paglieroni, "A Unified Distance Transform Algorithm and Architecture", "Machine Vision and Applications", 1992, pp. 47-55, vol. 5, Publisher: Springer-Verlag New York Inc.

Wunsch et al, "Registration of CAD-Models to Images by Interactive Inverse Perspective Matching", "Proceedings of ICPR '96", 1996, pp. 78-83, Publisher: IEEE, Published in: Wessling.

* cited by examiner

SYSTEM AND METHOD FOR FINDING CORRESPONDENCE BETWEEN CAMERAS IN A THREE-DIMENSIONAL VISION SYSTEM

RELATED APPLICATIONS

This application is a continuation-in-part of co-pending U.S. patent application Ser. No. 12/962,918, filed Dec. 8, 2010, entitled SYSTEM AND METHOD FOR FINDING CORRESPONDENCE BETWEEN CAMERAS IN A THREE-DIMENSIONAL VISION SYSTEM, the entire disclosure of which is herein incorporated by reference.

FIELD OF THE INVENTION

The use of advanced machine vision systems and their underlying software is increasingly employed in a variety of manufacturing and quality control processes. Machine vision enables quicker, more accurate and repeatable results to be obtained in the production of both mass-produced and custom products. Typical machine vision systems include one or more cameras (typically having solid-state charge couple device (CCD) or CMOS-based imaging elements) directed at an area of interest, a frame grabber/image processing elements that capture and transmit CCD images, a computer or onboard processing device, and a user interface for running the machine vision software application and manipulating the captured images, and appropriate illumination on the area of interest.

Many applications of machine vision involve the determination of the relative position of a part in multiple degrees of freedom with respect to the field of view. Machine vision is also employed in varying degrees to assist in manipulating manufacturing engines in the performance of specific tasks, particularly those where distance information on an object is desirable. A particular task using 3D machine vision is visual servoing of robots in which a robot end effector is guided to a target using a machine vision feedback and based upon conventional control systems and processes (not shown). Other applications also employ machine vision to locate stationary and/or moving patterns.

The advent of increasingly faster and higher-performance computers has enabled the development of machine vision tools that can perform complex calculations in analyzing the pose of a viewed part in multiple dimensions. Such tools enable a previously trained/stored image pattern to be acquired and registered/identified regardless of its viewed position. In particular, existing commercially available search tools can register such patterns transformed by at least three degrees of freedom, including at least three translational degrees of freedom (x and y-axis image plane and the z-axis) and two or more non-translational degrees of freedom (rotation, for example) relative to a predetermined origin.

One form of 3D vision system is based upon stereo cameras employing at least two cameras arranged in a side-by-side relationship with a baseline of one-to-several inches therebetween. Stereo-vision based systems in general are based on epipolar geometry and image rectification. They use correlation based methods or combining with relaxation techniques to find the correspondence in rectified images from two or more cameras. The limitations of stereo vision systems are in part a result of small baselines among cameras, which requires more textured features in the scene, and reasonable estimation of the distance range of the object from the cameras. Thus, the accuracy achieved may be limited to pixel level (as opposed to a finer sub-pixel level accuracy), and more computation and processing overhead is required to determine dense 3D profiles on objects.

Using pattern searching in multiple camera systems (for example as a rotation and scale-invariant search application, such as the PatMax® system, available from Cognex Corporation of Natick, Mass.) can locate features in an acquired image of an object after these features have been trained, either using training features acquired from the actual object or synthetically provided features, and obtaining the feature correspondences is desirable for high accuracy and high speed requirements since the geometric pattern based searching vision system can get much higher accuracy and faster speed. However, there are significant challenges to obtaining accurate results with training models. When the same trained model is used for all cameras in a 3D vision system, performance decreases as viewing angle increases between the cameras, since the appearance of the same object may differ significantly as the object provides a differing appearance in each camera's field of view. More particularly, the vision system application's searching speed and accuracy is affected due to the feature contrast level changes and shape changes (due to homographic projections) between cameras.

More generally, an object in 3D can be registered from a trained pattern using at least two discrete images of the object generated from cameras observing the object from different locations. In any such arrangement there are challenges to registering an object in three-dimensions from trained images using this approach. For example, when non-coplanar object features are imaged using a perspective camera with a conventional perspective (also termed "projective" in the art) lens (one in which the received light rays cross), different features of the acquired image undergo different transformations, and thus, a single affine transformation can no longer be relied upon to provide the registered pattern. Also, any self-occlusions in the acquired image will tend to appear as boundaries in the simultaneously (contemporaneously) acquired images. This effectively fools the 2D vision system into assuming an acquired image has a different shape than the trained counterpart, and more generally complicates the registration process.

The challenges in registering two perspective images of an object are further explained by way of example with reference to FIG. 1. The camera 110 is arranged to image the same object 120 moves to two different positions 130 and 132 (shown respectively in dashed lines and solid lines) relative to the camera's field of view, which is centered around the optical axis 140. Because the camera 110 and associated lens 112 image a perspective view of the object 120, the resulting 2D image 150 and 2D image 152 of the object 120 at each respective position 130 and 132 are different in both size and shape. Note that the depicted change in size and shape due to perspective is further pronounced if the object is tilted, and becomes even more pronounced the more the object is tilted.

One known implementation for providing 3D poses of objects using a plurality of cameras are used to generate a 3D image of an object within a scene employs triangulation techniques to establish all three dimensions. Commonly assigned, published U.S. Patent Application No. 2007/0081714 A1, entitled METHODS AND APPARATUS FOR PRACTICAL 3D VISION SYSTEM, by Aaron S. Wallack, et al., the teachings of which are incorporated herein as useful background information, describes a technique for registering 3D objects via triangulation of 2D features (derived, for example, using a robust 2D vision system application, such as PatMax®) when using perspective cameras. This technique relies upon location of trained features in the object from each camera's image. The technique triangulates the position of the located feature in each image, based upon the known spatial position and orientation of the camera within the world coordinate system (x, y, z) to derive the pose of the object within the coordinate system. While this approach is effective, it and other approaches are not optimal for systems using, for example, a differing type of lens arrangement, and would still benefit from increased accuracy of correspondences and decreased processor overhead.

More particularly, in certain robotic and/or pick-and-place applications at the microscopic and near microscopic range (e.g. generally involving objects or parts in motion that are between approximately 1-20 millimeters in size), it is often challenging to provide adequate guidance to the manipulator that receives, holds and delivers the object under manufacture (part). The vision system, consisting of multiple cameras, tracks movement of the object within the working area (where the object is "placed"), and potentially its pickup area, as well. The vision system, thus, guides the motion of the manipulator at one or more key positions to ensure the object is properly aligned in the place (and potentially the "pick") position. In general, the small size of the working area and object dictates that the manipulator be moved carefully to its final place (and potentially its initial pick) alignment position. This limits the speed of the overall manipulation operation. That is, the manipulator typically slows its approach speed as it enters the pick and/or place location so that the vision system can accurately guide it to a final, accurate alignment with the location. As an alternative, the manipulator can run at a greater speed in reaching the location, but is desirably fixtured to high accuracy so that it stops close to, or directly at, the aligned location. However, such accurate fixturing can limit the versatility of the system, and concomitantly increase setup time and costs.

It is, therefore, desirable to provide a 3D vision system arrangement that allows for more efficient determination of 3D pose of an object. This can, in turn, benefit the throughput and/or efficiency of various underlying operations that employ 3D pose data, such as robot manipulation of objects, and more particularly robot manipulation occurring at the microscopic and near-microscopic size range.

SUMMARY OF THE INVENTION

This invention overcomes disadvantages of the prior art by providing a system and method for determining correspondence between camera assemblies in a 3D vision system implementation having a plurality of cameras arranged at different orientations with respect to a scene involving microscopic and near microscopic objects under manufacture moved by a manipulator, so as to acquire contemporaneous images of a runtime object and determine the pose of the object for the purpose of guiding manipulator motion. At least one of the camera assemblies includes a non-perspective lens. The searched 2D object features of the acquired non-perspective image, corresponding to trained object features in the non-perspective camera assembly can be combined with the searched 2D object features in images of other camera assemblies (perspective or non-perspective), based on their trained object features to generate a set of 3D features (3D locations of model features) and thereby determine a 3D pose of the object. In this manner the speed and accuracy of the overall pose determination process is improved as the non-perspective image is less sensitive to object tilt and other physical/optical variations.

In an embodiment, a plurality of non-perspective lenses and associated cameras are employed to acquire a plurality of respective non-perspective images. The intrinsics and extrinsics of each non-perspective camera allow the generation of a transform between images that enables the 3D pose to be efficiently determined based upon the searched locations of 2D features on planar surfaces of the object. The transform is illustratively an affine transform.

In an illustrative embodiment, one or more camera assembly's non-perspective lens is a telecentric lens. The camera assemblies can illustratively include onboard processors in communication with each other, and/or an external processor (for example a PC) can operate on at least some data received from at least one (or some) of the camera assemblies. Illustratively, the pose determination process can be accomplished using triangulation of rays extending between object features and the camera, wherein the rays for the non-perspective camera are modeled as parallel rather than crossing at a focal point. The pose information can be used to perform an operation on the object using a device and/or procedure, such as the manipulation of a robot end-effector based upon the pose of the object.

In an illustrative embodiment, A system and method for guiding a manipulator that releasably holds an object sized in the microscopic or near-microscopic range is provided. The system and method includes a plurality of cameras, in which at least one of the cameras is optically connected to a non-perspective microscope lens that acquires a non-perspective image. The cameras are respectively oriented with a discrete field of view so as to contemporaneously acquire a plurality of images of the object in a location in which the object is undergoing a manufacturing task, respectively, at an alignment location with respect to the field of view. A search process is operatively connected to the cameras. It searches for 2D feature points in at least some of the acquired images, including the non-perspective image. An association process illustratively associates the 2D feature points with known 3D model points, and a pose determination process computes the 3D pose based upon the 2D feature points and known 3D model points. Illustratively, a manipulator control moves the manipulator to locate the object at the alignment location based upon the determined 3D pose.

BRIEF DESCRIPTION OF THE DRAWINGS

The invention description below refers to the accompanying drawings, of which.

DETAILED DESCRIPTION

I. System Overview

Figure 1:
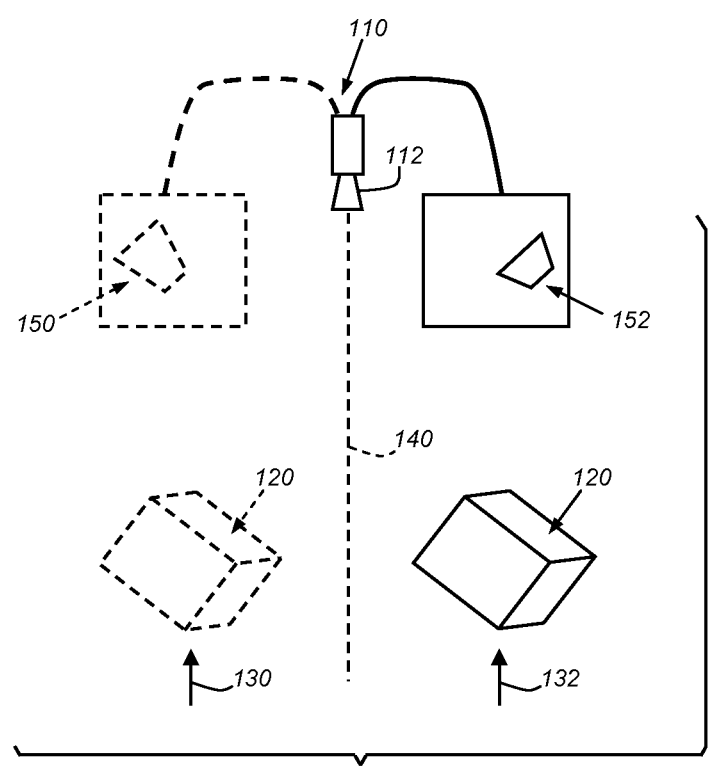
FIG. 1 is a schematic diagram of a perspective camera and lens arrangement showing the differences in the size and shape of an acquired image of an object as it moves with respect to the field of view.
Figure 2:
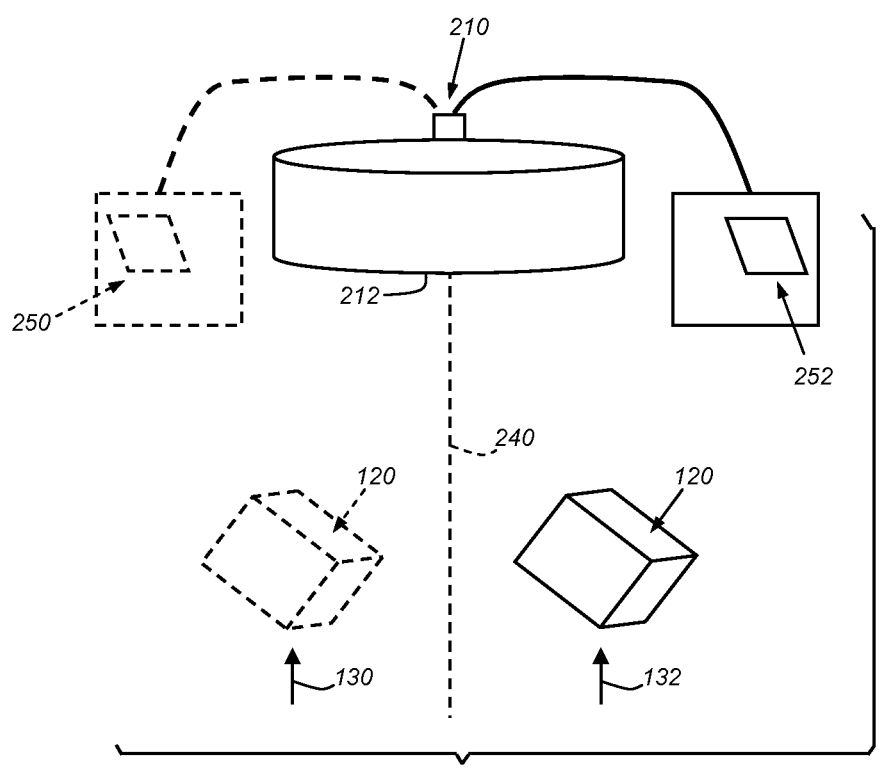
FIG. 2 is a schematic diagram of a non-perspective camera and lens arrangement employing an illustrative telecentric lens according to an embodiment in which an object in the camera's acquired image appears to be of similar size regardless of its distance from the camera.

With reference to FIG. 2, a camera 210 is shown with an attached telecentric lens 212 of conventional design. The lens, 212 can have any parameters appropriate to the field of view of the object 120, which similar to that of FIG. 1, moves between two positions 130 and 132 with respect to the camera's field of view (centered about axis 240). Telecentricity (as opposed to perspective projection) has the advantage that the object's appearance remains essentially unchanged as it moves through the field of view. As shown, the resulting images 250 and 252 have a similar shape and appearance due to the elimination of perspective effects. This is achieved because the rays passing through a telecentric lens are parallel, as opposed to crossing, as is the case with a conventional perspective optical arrangement.

It should be noted that the illustrative telecentric lenses shown herein are shown as symbolic representations and not generally drawn to scale. More particularly, a telecentric lens defines an area that is as large as the respective field of view—since the rays projected from the field to the lens are parallel with respect to each other.

As used herein, the term "image" as used herein should be defined as a 2D image acquired by one of the cameras and stored as image data. Likewise, the term "object" should be defined as a 3D physical object with features that can be imaged by the camera(s). The term "2D image features" is therefore defined as the projection of the object features onto the acquired image.

The telecentric lens 210 is illustrative a class of non-perspective lenses that can be provided to a camera according to embodiments of this invention. Generally, a telecentric lens is a compound lens which has its entrance or exit pupil at infinity. Thus, the chief rays (oblique rays which pass through the center of the aperture stop) are parallel to the optical axis in front of or behind the system, respectively. More generally, the lens 212 can be any type of "non-perspective lens", being defined generally as a lens in which the appearance of the object's image remains essentially unchanged as an object moves across the field of view, typically as a result of optics in which the light rays are parallel and/or uncrossed. Likewise, various advanced lens types, such as digitally focused lenses can be considered "non-perspective" herein.

It is also expressly contemplated that any of the cameras described herein can include additional sensors and/or lenses that can be non-perspective. In general, where a non-perspective lens is employed, at least one object image of the camera is acquired as a "non-perspective image" using this non-perspective lens. The particular "non-perspective camera" (i.e. a camera that acquires an image through a non-perspective lens) can, thus, include one or more additional perspective lenses that image onto a different or same sensor as the non-perspective lens. Such perspective lenses can acquire perspective images for use in aiming, range-finding, calibration, and other functions.

Figure 3:
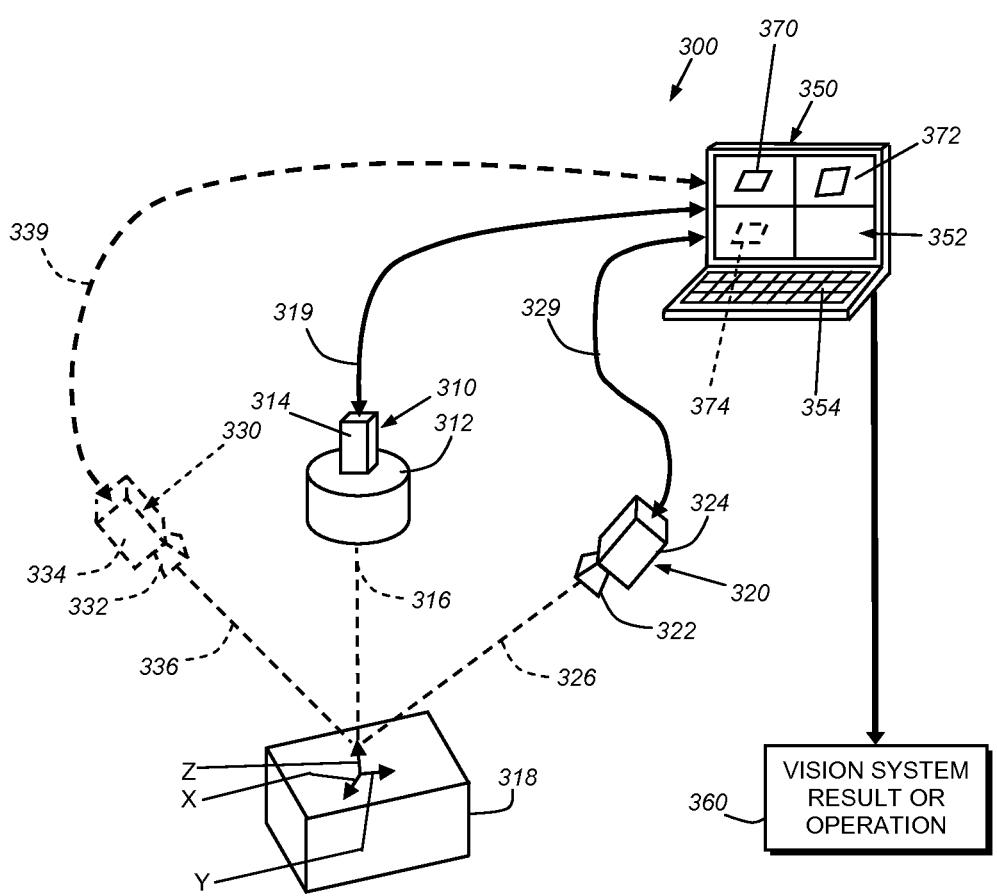
FIG. 3 is a diagram of an arrangement of camera assemblies to determine the 3D pose of an object within their common field of view, including at least one camera assembly employing a non-perspective lens according to an illustrative embodiment.

In an embodiment shown in FIG. 3, the system 300 includes a first camera assembly 310 having a camera 314 (that can include an image sensor, vision processor and appropriate hardware and/or software) and an attached telecentric or other non-perspective lens 312 in optical communication with the camera 314. A variety of conventional vision system camera assemblies can be employed according to the embodiments contemplated herein. The camera assembly 310 is positioned along an axis 316 to image the scene containing an object of interest 318 from a particular vantage point. As shown, a second camera assembly 320 containing a lens 322 and vision system camera 324 is provided along an axis 326 with respect to the scene. This second camera assembly 320 thereby images the object 318 from a second vantage point that is spaced at a predetermined baseline and oriented differently than the first camera assembly's vantage point. An optional third camera assembly 330 (shown in phantom) is also provided. It contains a lens 332 and vision system camera 334 oriented provided along an axis 336 with respect to the scene. This third camera assembly 330 thereby images the object 318 from a third vantage point that is spaced at a predetermined baseline and oriented differently than the first and second camera assemblies' vantage points. For the purposes of this embodiment, at least two camera assemblies are employed, and one of the two camera assemblies includes a non-perspective lens. It is expressly contemplated that additional cameras (not shown) can be oriented to image the object 318 at other vantage points in alternate embodiments.

Each camera assembly 310, 320, 330 is interconnected to a general purpose computer 350 via a respective interface link 319, 329, 339 of any acceptable type (wired, wireless, etc.). The general purpose computer 350 includes a display 352 and user interface 354 (for example keyboard, mouse, touch screen, etc.). In alternate embodiments, a different interface device can be used in conjunction with the camera assemblies, such as a smart phone, personal digital assistant, laptop computer, etc. The computer can run one or more vision system applications or can be employed primarily as an interface device with the vision system applications residing on, and running on one or more of the cameras, which are interconnected to share data. The computer 350 can also be used for training, and subsequently disconnected during runtime, in which the cameras operate independently of an interconnected computer. The system 300 produces a vision system result or operation 360 that is passed from the computer 360 as shown, or provided directly from one or more of the cameras. This result or operation can be (for example) pose information and/or a command that is provided to an appropriate robot motion controller to move a robot end effector.

In this embodiment, the lenses 322 and 332 of respective camera assemblies 320 and 330 are perspective lenses that can be conventional in design. The discrete images acquired by the camera assemblies 310, 320, 330 would typically have differing appearances. See for example images 370, 372 and 374 on display 352. Because the lenses 322, 332 of camera assemblies 320 and 330, respectively, are perspective lenses, the images acquired by these cameras vary in shape and size with respect to each other due to their differing orientations. The shape and size of the projected object in the acquired images of each perspective camera assembly will also potentially vary from object-to-object based upon the likelihood that each object will be presented in a slightly different orientation, tilt and location within the field of view. This complicates the vision system's search for features in each perspective image. However, the projected object in the first camera assembly's acquired image, taken through the non-perspective lens 312 will remain essentially unchanged in shape and size regardless of translation within the field of view. If the object tilts or rotates in the field of view, its planar surfaces undergo an affine transformation with respect to the projected object in the first camera assembly's acquired image.

Providing at least one camera in the system with a non-perspective lens allows for a maintained appearance regardless of position within the field of view, which has the advantage of simplifying the machine vision task. That is, the application searches for a single appearance of the trained object features across the field of view as opposed to having to search for the features in different appearances as a function of object position.

As described more generally above, a powerful machine vision tool for registering objects in 2D is the well-known PatMax® system available from Cognex Corporation of Natick, Mass. This system allows the two-dimensional pose of a subject part to be registered and identified quite accurately from a trained pattern, regardless of rotation and scale. Two-dimensional (2D) machine vision tools, such as PatMax® are highly robust.

Advanced machine vision search tools such as PatMax® also have the ability to take advantage of the previous known position of a search subject or target. This narrows the search area to positions relatively near the last known location. Therefore, searching is relatively faster on the next cycle since a smaller area is searched. In addition, these search tools can tolerate partial occlusion of a pattern and changes in its illumination, adding further to their robustness with respect to less-advanced machine vision approaches.

PatMax® operates by first finding a coarse pose of the object in an acquired image, and then refining this pose using an iterative, reweighted least-squares approximation of the acquired image with respect the trained image that progressively reduces the relative error therebetween with each iteration. That is, the original coarse pose is initially compared to the trained data. The data that appears to match best is reweighted to give that data a higher value in the overall calculation. This serves to remove portions of the image that may represent occlusions, shadows or other inconsistencies, and focusing the analysis upon more-reliable portions of the feature. After reweighting, a least-squares statistical approximation is performed on this data to refine the approximation of location and position of the object in the field of view. After (for example) approximately four iterations, the final position and location are determined with high accuracy.

Note, it is contemplated that the first camera assembly 310, with its non-perspective lens 312, can be positioned at a variety of vantage points with respect to the scene. In an embodiment, it is positioned approximately directly overhead of the object's location, with other non-perspective camera assemblies 320, 330, etc., oriented at oblique angles to the vertical (i.e. the z-direction in the world coordinate system (x, y, z)). Note that orientational and directional terms such as "up", "down", "vertical", "horizontal", and the like, should be taken as relative conventions within the system's 3D geometry, and not as absolute terms with respect to the direction of gravity.

Figure 4:
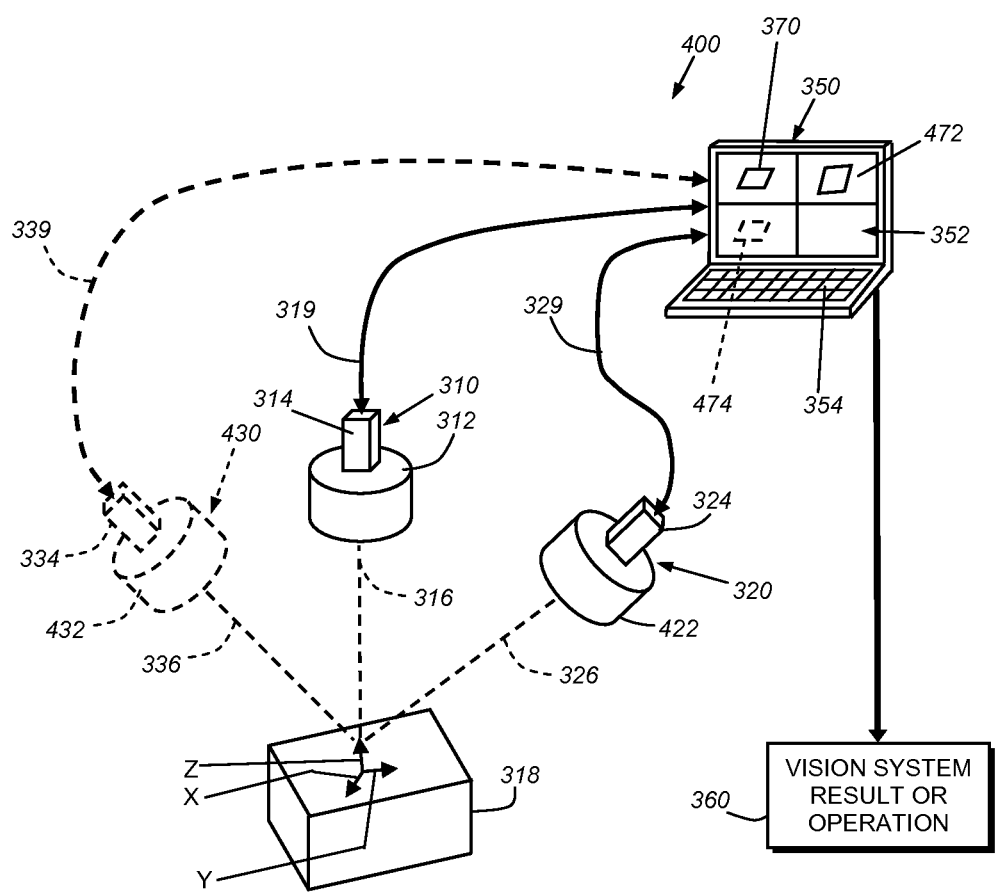
FIG. 4 is a diagram of an arrangement of camera assemblies to determine the 3D pose of an object within their common field of view, including a plurality of camera assemblies employing non-perspective lenses according to another illustrative embodiment.

In another embodiment, as shown in FIG. 4, the system 400 consists of a plurality of camera assemblies 310, 420 and 430 (shown in phantom) which is otherwise similar for purposes of this description to the system 300 of FIG. 3. Where the same or a substantially similar component is employed, like reference numbers to those provided in FIG. 3 are used, and the above-description should be referenced for that component's structure and function. The camera assembly 310 includes the non perspective lens 312, mounted on the camera 314 as described above. It acquires images (370) of the object 318 that are unaffected by perspective. Likewise, the camera assembly 320 provides a non-perspective lens 422, mounted on the camera 324 so as to acquire images (472) that are unaffected by perspective. Further optional camera assemblies (assembly 430, shown in phantom) can be provided at different vantage points and orientations with non-perspective lenses (lens 432) or, alternatively perspective lenses to acquire further perspective or non-perspective images (374) for use in determining 3D pose of the object 318. In this embodiment, at least two camera assemblies with non-perspective lenses are provided with optional additional camera assemblies having perspective or non-perspective lenses. As described in further detail below and particularly with respect to planar features on objects imaged by each of the non-perspective camera assemblies, the correspondence of feature points between non-perspective images is computationally efficient, and can be accomplished, for example, using an affine transform with knowledge of each camera's intrinsic parameters and extrinsic parameters (e.g. its orientation and distance from the object in the world coordinate system (x, y, z)).

In an embodiment, the telecentric lens assemblies (e.g. 312, 422 and 432) are each part of a microscope optics assembly used in conjunction with the respective vision system camera. The vision system guides a manipulator in the assembly and/or manufacture of components employing small objects under manufacture, such as computer storage disk drive heads. By the term "object" it meant any part, component or other structure that can be moved between locations, typically from a source (a "pick") location to a receiving (a "place") location, each of which require that a manipulator handling the object be appropriately aligned with respect to that location to ensure that the object is accurately received and delivered/assembled. More generally, movement of the object in the region of placement/assembly is guided by the vision system and microscope optics assembly.

The cameras can comprise any acceptable solid-state imaging device employing, for example a CCD or CMOS imager (also termed an "image sensor"). By way of non-limiting example, the imager is a rectangle or square shape and sized 0.5 inch or less. Also by way of non-limiting example, the telecentric microscope lens assembly can be based upon an MML series device available from Schott Moritex Corporation of Japan (e.g. the Moritex MML2-ST110D model lens). Illustratively, for model ST110D and other similar/equivalent lenses the overall object size is approximately ¾ of the imaged field of view of the lens and the focal distance is approximately 113 millimeters. Resolution is approximately 14 microns and depth of field is approximately 1.68 millimeters. These parameters are representative of a wide range of possible values that can be selected based upon the particular manufacturing application and vision system arrangement. By way of useful background information, data and specifications related to this series of microscope lens is available via the Word Wide Web at the URL address www.schott-moritex.com/assets/moritex/import/series_item/catalog/catalog_MML-ST_Series.pdf.

Figure 4A:
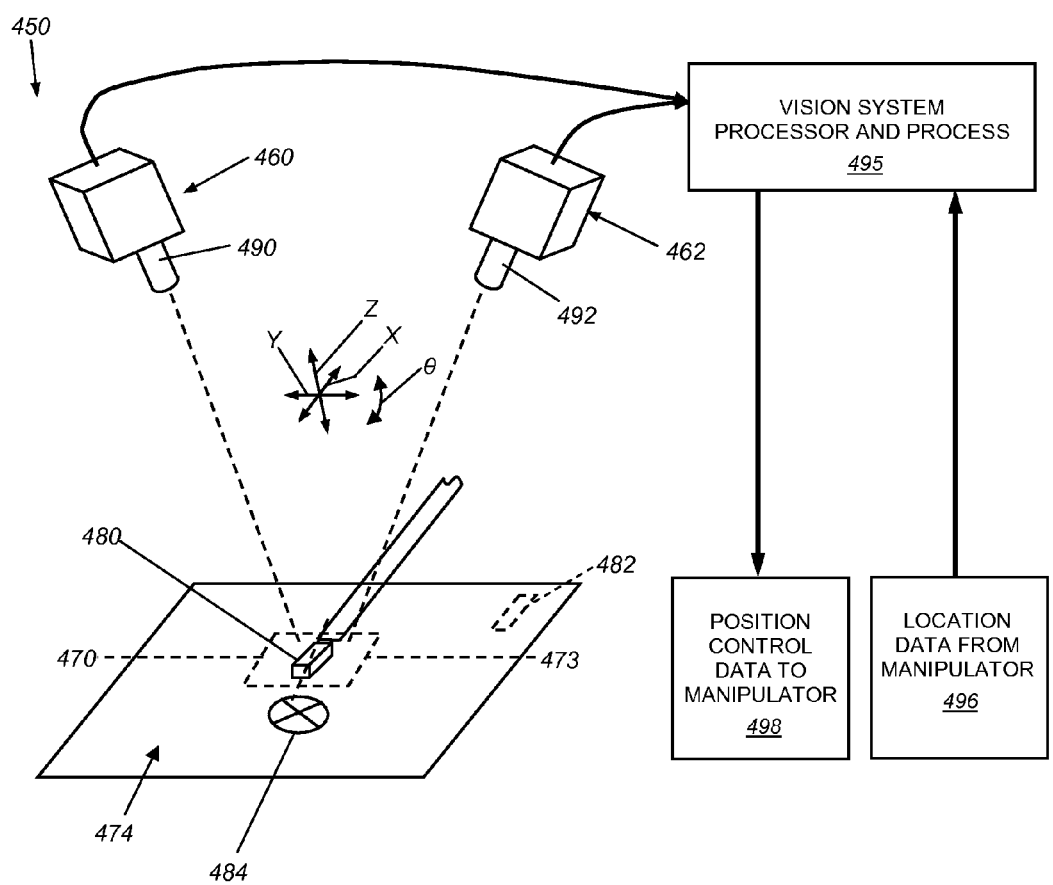
FIG. 4A is a diagram of an arrangement of camera assemblies having microscope lens assemblies used in conjunction with a vision system and associated processors/processes for robot manipulation of an object in the microscopic or near-microscopic size range.

With reference briefly to FIG. 4A, an exemplary manufacturing arrangement 450 including at least two vision system camera assemblies ("cameras") 460 and 462 is shown. These cameras are illustratively implemented as microscopes with telecentric lenses. Each camera 460, 462 images a discrete field of view (that can be overlapping) 470, 473 in the overall imaged scene 474. In this exemplary arrangement 450, an object 480 is manipulated between a source, or pick, location 482 to a receiving, or place, location 484. At least the place location is desirably aligned to a very high tolerance (potentially microns) and the object itself is typically sized overall (length, width and height of all elements to be imaged) in the "microscopic" or "near-microscopic range"—typically defined herein a 2-20 millimeters and potentially smaller. The vision system cameras are arranged to image small features (e.g. edges, corners, etc.) on the object 480. Because of the object size and alignment limitations, the vision system camera assemblies 460 and 462 are arranged with microscope optics 490 and 492, respectively. These optics 490, 492 each operate as telecentric lenses in accordance with an illustrative embodiment. In alternate embodiments, at least one optics assembly is telecentric, while one or more other optics assemblies can be implemented according to a different principle. The object 480 is physically moved between locations 482, 484 by an appropriate manipulation assembly, which in this embodiment can comprise a robotic arm 494, with an appropriate end effector or other fixture for holding the object in a releasable orientation. The arm 494 can move in at least one degree of freedom and, as depicted moves/translates in four degrees of freedom—e.g. x, y and z axes and rotation θ about the z axis within the x-y plane. Motion/translation of the manipulator in further degrees of freedom (e.g. tilt about the x and/or y axes) can be provided in further embodiments.

As shown, the cameras 460, 462 and optics 490, 492 are arranged to image the place location. Other cameras (not shown) can be arranged to image the pick location and/or other locations that track the path of the object between pick and place locations (for example, one or more intermediate locations in which the object is inspected and/or further manufacturing steps are performed to it). The principles of the illustrative embodiment can be applied to pluralities of cameras arranged at any location within the path of the object as it is moved by the manipulator.

In this embodiment, the cameras each transmit acquired image data to a vision processor assembly 495 having associated processes for corresponding cameras as described herein. In alternate embodiments, one or more cameras can include the processor assembly used herein. The processor assembly 495 includes integral or interconnected processing components that are used to control the position of the manipulator as it moves the object 480 into alignment with the place position 484, and optionally with the pick position 482.

Illustratively, the manipulator (494) can provide position information (e.g. encoder data, stepper pulses, etc.) 496 to the vision system and/or associated processor 495 so that feedback on current position is available to control manipulator motion. Position control of the manipulator can be based upon control signals derived from the visual location feedback returned from the vision system relative to located and analyzed features in each camera's field of view, and appropriate correspondence between features in each field by the illustrative system and method.

II. Camera Calibration

Perspective cameras can be calibrated to determine their extrinsic and certain intrinsic parameters ("extrinsics" and "intrinsics", respectively), including 3D orientation with respect to the world coordinate system (x, y, z) and relative distance from an object within the scene, using known techniques, such as those shown and described in commonly assigned published U.S. Patent Application No. US 2008/0298672 A1, entitled SYSTEM AND METHOD FOR LOCATING A THREE-DIMENSIONAL OBJECT USING MACHINE VISION, by Aaron S. Wallack, et. al, the teachings of which are expressly incorporated herein by reference by way of useful background information. As described, a calibration plate (for example, a square having the appearance of a regular, tessellated black and white checkerboard) is placed in a fixed position while each perspective camera acquires an image of the plate. The center of the plate can include a fiducial that can be any acceptable shape capable of resolution in multiple dimensions. The fiducial typically defines the origin of the three orthogonal axes, (x, y, z). Each axis defines a direction of translation within the space of the cameras. Likewise, a rotational degree of freedom Rx, Ry and Rz is disposed about each respective axis (x, y and z).

The system application, stores calibration data in one or more storage locations (for example, the individual camera and/or the computer 350). This data is used by the system to allow any image derived by a given camera in the imaging system to register that image within a common three-dimensional world coordinate system as shown. The system employs well-known calibration techniques to provide such a common coordinate system based upon a single, viewed calibration plate and fiducial. By way of further background, a discussion of camera calibration and use of calibration plates can be found in the CVL Library under the general heading Multiple Field of View Camera Calibration and or "Checkerboard" calibration, commercially available from Cognex Corporation of Natick, Mass. In addition, a discussion of mutually calibrated cameras using the same calibration plate is provided in above-incorporated published U.S. patent application, entitled METHODS AND APPARATUS FOR PRACTICAL 3D VISION SYSTEM.

Figure 5:
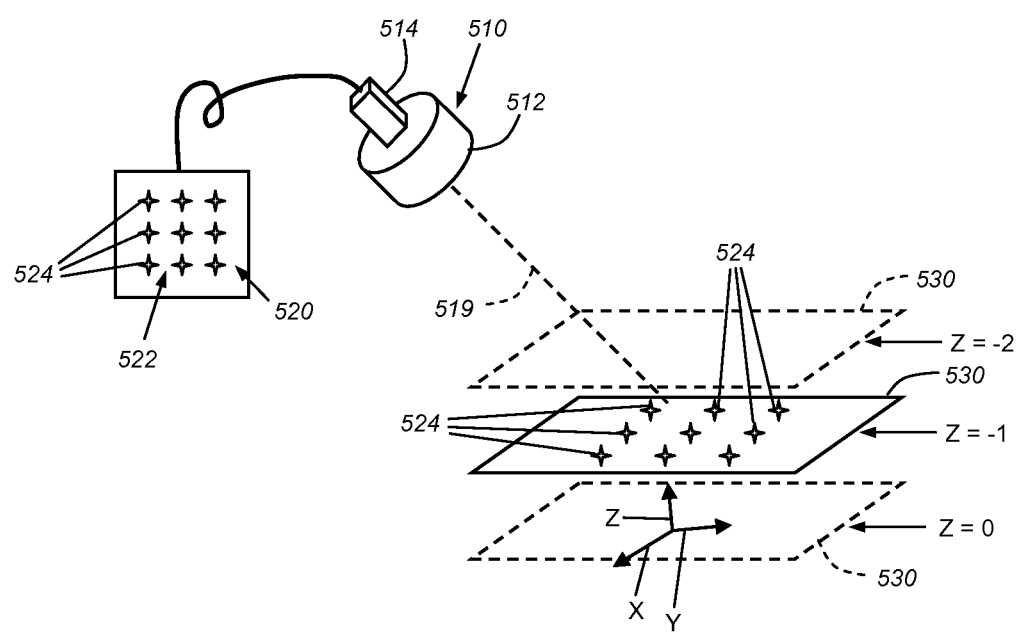
FIG. 5 is diagram of an illustrative technique for calibrating a non-perspective camera with respect to a 3D world coordinate system.

Determining a non-perspective camera assembly's extrinsic parameters with respect to the world coordinate system entails a different approach, as shown with reference to FIG. 5. The camera assembly 510 consists of a camera 514 of a type described generally above and an attached non-perspective lens 512. In this embodiment, the lens 512 is a telecentric lens. The camera assembly accordingly acquires non-perspective images, as shown on the display 520. The camera in this example is oriented along an axis 519 with respect to the coordinate system (x, y, z). The calibration of a camera with a telecentric lens is accomplished in this illustrative embodiment by providing images (522) of a flat calibration plate 530 having predetermined fiducials/features 524 at multiple, precisely known poses.

In order to achieve precisely known poses, a vertical motion stage (which can be of conventional design—not shown) is employed. This stage only moves in the z direction, and maintains a constant x, y position while it moves in z. Also, the visible plane of the flat calibration plate 530 is oriented substantially exactly parallel to the x, y axes of the stage and substantially exactly perpendicular to the z axis of the stage. A flat calibration plate is desirably employed because there is typically no assurance that the plate's x/y axes are aligned to the motion stage's x/y axes, but there is high confidence that the calibration plate's z axis (which is perpendicular to the plate) is substantially exactly aligned to the motion stage's z axis.

Once the calibration plate is placed within the camera's normal field of view, the calibration process begins with the acquisition of multiple images of a calibration plate at known z positions. These are represented by positions z=0, z=−1 and z=−2. The precise number of positions (as well as the sign and units) in which images are acquired is highly variable. For example, the z positions can be z=100, z=0, z=−100 depending upon the units in which the stage is graduated, and the appropriate amount of motion between selected stage positions. In any case, the system is provided with the stage's precise valve for z for the stage for each acquired image. For each acquired image (each value for z), the plate's image 2D fiducial/feature positions are measured. The corresponding physical 2D positions on the calibration plate are also determined. With knowledge of the z position of each acquired image, the images of 2D feature positions are, thus, associated with physical 3D positions. The result is a set of 2D points A (x, y) corresponding to a set of 3D points B (u, v, w).

Since the projection is linear, an x-coordinate function can be computed to predict the x value of points A from the u, v, w values of points B. The x function f1 is characterized as x=f1 (u, v, w). Likewise, a y function f2 is characterized as y=f2(u, v, w)). Illustratively, a linear least squares function can be employed since there exist more data than unknowns in the computation.

There are now defined two sets of variables, C, D, E, F and G, H, I, J, such that $$x=f1(u,v,w)=C*u+D*v+E*w+F; \text{ and}$$

$$y=f2(u,v,w)=G*u+H*v+I*w+J.$$

These linear coefficients can provide the basis for a 2×4 transform:

$$\begin{vmatrix} C & H & E & F \\ G & H & I & J \end{vmatrix}$$

The telecentric calibration's unknowns are the pose of the camera and the pixel scale of the camera. The pose of the camera is its extrinsic parameters and the pixel scale of the camera is its intrinsics. The camera sensor may also exhibit an x/y relationship (e.g. the x and y pixel dimensions are not a perfect square), so a shear parameter may be provided in the intrinsics.

This arbitrary 2×4 transform (in which the z value is not specific) is decomposed into a rigid transform (accounting for rotation and translation) followed by a 2D scale/shear. This can entail decomposing the linear coefficients and separately decomposing the constant coefficients. Note that it is generally not possible to determine the z position of a telecentric camera (because the rays are parallel, thereby providing no mechanism for determining the camera's position along the rays). Instead, the user specifies a z value, as this does not affect the projected positions of features in any case. The decomposition of linear coefficients and constant coefficients for a rigid transform [telecentricXform] is as follows:

```
// |Intrinsic||Extrinsic| = |TelecentricXform|
```

$$// \begin{vmatrix} xScale & shear & 0 \\ 0 & yScale & 0 \end{vmatrix} \begin{vmatrix} Rot\_3X3 \end{vmatrix} = \begin{vmatrix} C & D & E \\ G & H & I \end{vmatrix}$$

```
// and
```

$$// \begin{bmatrix} xScale & shear \\ 0 & yScale \end{bmatrix} \begin{bmatrix} transX \\ transY \end{bmatrix} = \begin{bmatrix} F \\ J \end{bmatrix}$$

According to an illustrative procedure, a 3D affine transform is constructed, corresponding to the eight coefficients (C, D, E, F, G, H, I, J) by setting the z row to identity and the z translation to 0, thereby producing the affine transform:

$$\begin{vmatrix} C & D & E \\ G & H & I \\ 0 & 0 & 1 \end{vmatrix} \begin{vmatrix} F \\ J \\ 0 \end{vmatrix}$$

Based upon this affine transform, the following programmatical (and commented) steps can then be performed starting with the following arrangement of coefficients (the well-known C++ language is employed in this example, as well as classes such as cc3Xform from the CVL C++ Software Development Library, which is available through the Cognex Corporation Website):

```
telecentricXform =
    cc3Xform(cc3Matrix(xCoefficients[0],xCoefficients[1],xCoefficients[2],
            yCoefficients[0],yCoefficients[1],yCoefficients[2],
            1 0, 0, 1),
        cc3Vect(xCoefficients[3],
            yCoefficients[3],
            0));
// The xAxis and the yAxis of the 3×3 affine transform is then extracted.
    cc3Vect xAxis = telecentricXform.matrix( ).transpose( )*cc3Vect(1,0,0);
    cc3Vect yAxis = telecentricXform.matrix( ).transpose( )*cc3Vect(0,1,0);
// The component of the xAxis which is perpendicular to the yAxis, termed
// xAxisPerp is then computed.
    double xAxisDotYAxisUnit = xAxis.dot(yAxis.unit( ));
    cc3Vect xAxisPerp = xAxis − yAxis.unit( )*xAxisDotYAxisUnit;
// The zAxis which is perpendicular to the computed xAxisPerp and the
// yAxis is also computed.
    cc3Vect zAxis = xAxisPerp.unit( ).cross(yAxis.unit( ));
// A rotation matrix "cc3Matrix rotation" (which has unit length in all
// three axes, and which all three axes are perpendicular) is computed.
    cc3Matrix rotation =
        cc3Matrix(xAxisPerp.unit( ).x( ),xAxisPerp.unit( ).y( ),
        xAxisPerp.unit( ).z( ),
            yAxis.unit( ).x( ),yAxis.unit( ).y( ),yAxis.unit( ).z( ),
            zAxis.x( ), zAxis.y( ), zAxis.z( ));
// A transform "mappedTelecentricXform" is then computed, from which
// the camera calibration coefficients can be extracted.
    cc3Xform rotXform(rotation,
            rotation*
            telecentricXform.matrix( ).inverse( )*
            telecentricXform.trans( ));
    cc3Xform rotXformInv = rotXform.inverse( );
    cc3Xform mappedTelecentricXform = telecentricXform*rotXformInv;
    mappedTelecentricXform * rotXform = telecentricXform;
    double scaleX = mappedTelecentricXform.matrix( ).element(0,0);
    double scaleY = mappedTelecentricXform.matrix( ).element(1,1);
    double skew = mappedTelecentricXform.matrix( ).element(0,1);
// The camera's intrinsics are specified by scaleX, scaleY, skew, and
// mappedTelecentricXform.trans( ).x( ) and
mappedTelecentricXform.trans( ).y( ).
// The camera's extrinsics (Camera3D from Physical3D) are thereby
// specified by rotXform.
```

Thus, as described above, by controlling the vertical movement of a scale calibration plate and deriving a transform, the extrinsics and intrinsics of one or more non-perspective cameras can be derived and used in subsequent, runtime image acquisition processes. These allow the location of features within the image to be accurately determined. This becomes data for use in a correspondence process between feature points found by each of the plurality of cameras in the system. In particular, the system computes the transform pose which maps 3D training model points to lie along the rays (extending between the camera and the points) that correspond to the 2D image points. Finding this correspondence, and using, for example, triangulation techniques based upon the mapped rays allows for determination of the 3D position of the point and the determination of the overall 3D pose of the object in the world coordinate system.

As used herein the term "model" (or "model image") should be defined as a region corresponding to a projection of the object (or a projection of a portion of the object) in an image acquired by the camera(s). In practice, a plurality of discrete models is employed with respect to a single object, in which each model is a subset or portion of the object. For conciseness, this Description refers to the term "model" with respect to training and runtime operation of the system. It is expressly contemplated that the processes described herein can be carried out using a plurality of models, in which the results obtained with each of the plurality of models are combined according to conventional techniques to obtain a final result. Thus the term "model" should be taken broadly to include a plurality of models with respect to the object and/or the iteration of any process performed with a described single model on each of a plurality of additional models (all related to the object). Likewise, the term "3D features" should be defined as the 3D locations of the model features (consisting of feature points) with respect to a coordinate system (for example, the world coordinate system for the scene).

Note that training of each camera in the system with the model image feature points to be used as a template for runtime feature searches can occur in a variety of manners using the vision system application. These techniques are known in the art. More particularly, one technique involves the acquisition of an image of a training object at a plurality of poses and identifying features of interest (edges, holes, etc.). Another approach entails, by way of example, simultaneously (i.e. contemporaneously, at substantially the same or overlapping times) acquiring images of the object from the plurality of cameras and, then, shining a laser pointer at various features of the object. From images acquired with the laser shining, the 3D location of the laser point can be computed, thereby, defining coincident origins on all images of the object features. To this end, using the images with and without the superfluous laser pointer spot, auto Thresholding and blob analysis can be run to find the center of the spot in all the images, and thereby to determine consistent coincident origins.

After training, triangulation can be used to determine the 3D position of the spot and underlying feature based upon the image(s) provided by perspective camera's and the image(s) provide by non-perspective camera(s) during runtime.

III. 3D Pose Solving in an Optional/Alternate Implementation

The following is a technique that solves the 3D pose for a plurality of cameras by way of further background and as an alternate or optional technique for use in accordance with various embodiments. As described above, the system can use intrinsics and extrinsics (multi-camera calibration results) to compute a runtime object image's 3D poses from 2D image points which correspond to 3D training model positions.

As will be described further below for cameras with perspective lenses the 2D image positions correspond to rays through each camera's origin. Thus, finding a pose which maps the 2D image points to the corresponding 3D model points is analogous to finding a pose which maps the 3D model points onto the rays corresponding to the 2D image points. In the case of a perspective camera assembly, the rays each cross through a common camera origin. In the case of a non-perspective camera all rays are parallel and define discrete points of emanation within the camera image plane, rather than a central camera origin. The computation accounts for the orientation of each camera's rays with respect to the camera's axis, image plane and origin (where applicable). The following principles can be adapted to both perspective and non-perspective camera arrangements by accounting for the orientation of the rays in the computations.

The computation procedure can illustratively employ a function which maps from 3D pose to sum squared error, and then finding the pose with minimum error relative to the training model image. The 3D poses are characterized by quaternions, which are four numbers (a, b, c, d) that characterize a rigid 3D rotation by quadratic expressions (rather than trigonometric expressions). This form of expression is more efficiently employed by a computer processor. Note that quaternions require that $a^2+b^2+c^2+d^2=1$. The rotation matrix corresponding to the quaternions (a, b, c, d) is shown below:

$$\begin{vmatrix} a^2+b^2-c^2-d^2 & 2bc-2ad & 2ac+2bd \\ 2ad+2bc & a^2+c^2-b^2-d^2 & 2cd-2ab \\ 2bd-2ac & 2ab+2cd & a^2+d^2-c^2-b^2 \end{vmatrix}$$

Using quaternions, the system constructs a polynomial expression characterizing the error in terms of (a, b, c, d, X, Y, Z), where a, b, c, d represent the rotation and X, Y, Z (also referred to as respective translation variables tx, ty, tz) represent the translation. The Levenberg-Marquardt Algorithm (LMA) or other numerical solvers (such as the Gauss-Newton algorithm) can be used in this embodiment to find the configuration which induces minimum error.

Note that the system only solves for six variables at a time, while there exist a total of seven variables—rotation variables a, b, c, d, and translation variables tx, ty, tz. Since the above process has yielded the approximate, coarse pose estimate, the system can enforce that one of the four (a, b, c, d) variables is fixed at 1 or −1 (for example the system can choose one of the a, b, c, or d variables which has maximal magnitude at the coarse pose estimate). The solution is mainly concerned with the ratios between a, b, c, and d; i.e., the result remains constant if all of a, b, c, and d are multiplied by the same constant value. Thus, by fixing one of the four a, b, c, d values, the primary restriction is that the value that is fixed does not correspond to 0 in the optimal solution. For this reason, the variable having the maximum magnitude of a coarse pose candidate (if one exists) is selected to be equal to 1 or −1.

If an initial coarse pose estimate is unavailable, the system can alternatively run eight (8) separate solvers where a, b, c, and d are each set to 1 or −1 respectively. This is because it is difficult to numerically minimize an error function while simultaneously enforcing the constraint $(a^2+b^2+c^2+d^2=1)$. Rather, either a, b, c, or d is set to 1 or −1 and then the remaining six variables are solved-for. More particularly, solving for each of the following eight (8) cases is appropriate: a=1, a=−1, b=1, b=−1, c=1, c=−1, d=1 and d=−1.

IV. 2D/3D Correspondence in an Exemplary Implementation

By way of further background, the system can determine which featurelet/edgelet in a searched image corresponds to which 3D model image point. Note that for the purposes of this section, the term "edgelet" can be used interchangeably with the term "model feature(s)". Given a pose estimate, the system can efficiently employ lookup tables to determine which 3D model point illustratively corresponds to each image featurelet or edgelet. By way of further background explanation, a featurelet/edgelet is a small segment of a defining boundary of a planar face or other registered feature on the training model image and runtime object image. The 3D model points can be collected into distinct coplanar sets from which a lookup table is constructed, which finds the "closest" model point to every point in the plane. Then, given the pose, the projection corresponding to each image edgelet is intersected with each lookup table plane. Then, the system performs a look up from the table for the "closest" model point.

Figure 6:
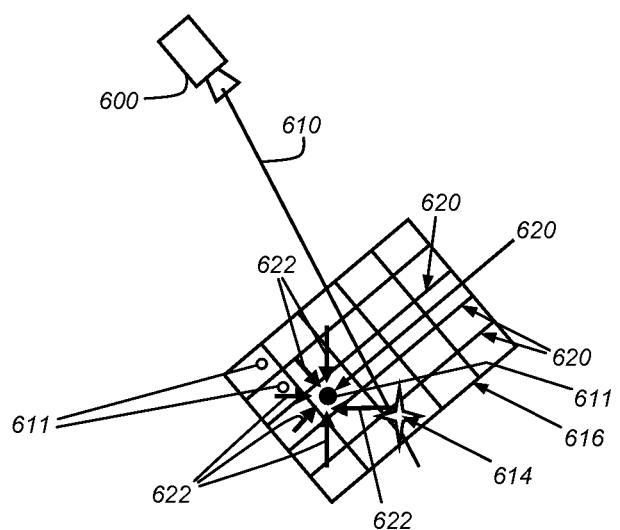
FIG. 6 is a diagram of an exemplary object feature having a point imaged by a camera, and depicting an imaginary ray between the feature point and the camera.

By way of further illustration, and with reference to FIG. 6, for each model plane 610 of model features 611, the system intersects an imaginary ray 610 through the runtime image featurelet/edgelet 614, camera (600), and that plane 616. This projection provides a 2D position (within a 2D coordinate system as symbolized by the grid lines 620) on the plane 616 of model features. The system can employ a conventional correspondence lookup table to determine the model feature 620 closest (symbolized by arrows 622) to this ray 610. Such a 2D lookup table can be constructed as a Voronoi table based on the model points similar to the manner described by D. W. Paglieroni in "Distance Transforms" published in Computer Vision, Graphics, and Image Processing, 54:56 (74, 1992) or the manner described by D. W. Paglieroni in "A Unified Distance Transform Algorithm and Architecture" published in *Machine Vision and Applications* 47-55, Volume 5, Number 1, December 1992, the teachings of which are herein incorporated by reference. Each entry in the 2D lookup table should record the closest model feature as computed/determined in the Voronoi table. There may be multiple candidate matches (i.e. one closest-point for each model plane), in which all the identified matches (on various model planes) satisfy the feature orientation constraint and any distance constraint (e.g. maximum allowable distance that the system recognizes for determining closeness). The feature orientation constraint relates to the orientation match between the model feature viewed at its current pose and the orientation of the runtime feature—i.e. the system is aware of the 3D direction of the edge at each model point, because it knows the edgelet orientation at each model point and it knows the plane in which the model feature resides. Alternatively, the system can choose to only use the model feature (from all of the candidate planes) which "best matches" the runtime feature. It should be noted that every edgelet can be characterized by a discrete ray, thereby allowing each edgelet to be matched readily with the closest 3D position/model feature for that ray.

V. Triangulation

Also, by way of background, position triangulation during runtime in conventional perspective camera assemblies can be accomplished using pattern matching or other 2D vision tools (for example PatMax®) to discern the pixel-wise location of feature points in the runtime images, and using the mappings discerned during the calibration phase to correlate the pixelwise locations of those feature points in each respective camera's fields of view with the above-described 3D rays on which those patterns lie. These techniques can be adapted to include non-perspective camera assemblies that can be used in a variety of roles, including verifying the feature locations determined by other perspective camera assemblies in the system, and providing feature location data for use in combination with the perspective camera's location data.

Triangulation of feature location may be by "direct" triangulation, e.g., wherein the location of a given feature is determined from the point of intersection of multiple 3D rays (from multiple cameras) on which that feature lies. Alternatively, or in addition, triangulation may be "indirect," as where the location of a given feature is determined not only from the ray (or rays) on which that feature lies, but also from (i) the rays on which the other features lie, and (ii) the relative locations of those features to one another (e.g., as determined during the training phase) on the imaged object.

Direct and/or indirect triangulation can utilize "least squares fit" or other such methodologies for finding points of intersection (or nearest intersection) as between or among multiple 3D rays (from multiple cameras) on which feature(s) appear to lie. For example, where images acquired from two or more cameras indicate that a given feature (and, more precisely, the apparent origin of that feature) lies on two or more rays, a least squares fit methodology can be employed to determine a location of intersection of those rays in 3D space or a nearest point thereto (i.e., a point in space that lies nearest those rays). Likewise, where images from the cameras indicate origins for multiple features on multiple rays, a least squares fit can be employed using the model points of those features on the object to determine the most likely locations of the features and/or the object itself.

In an embodiment, an optimizer (or "solver") can be used to find the least squares (or root mean square) fit of rays and features as described above with respect to triangulation. This can be a general purpose tool of the type available in the art or customized to the particular system. During runtime, the solver is supplied with definitions of the 3D rays on which the features (and, more precisely, the feature origins) identified from the runtime images lie, as well as (where relevant) the locations or relative locations of the features on the object.

As also described above, typically, this information defines an over-constrained system (i.e., more information is supplied by way of ray definitions and relative feature locations on the object than is necessary to infer the actual feature locations). This enhances the robustness of the technique. For example, the system should be capable of determining object pose, e.g., even where features are missing from the object or its runtime image (e.g., as where a feature is occluded from one or more camera views, or where lighting or other conditions to not permit timely acquisition of a feature image).

By way of further example, the system can include a process for trying subsets of the feature origins (and, more precisely, subsets of the locations corresponding to feature origins) in order to minimize the root mean square (RMS) error of the fit between the rays and the model points or the triangulation of the rays. Then, the process can extrapolate the 3D position of the features which were not included in the subset (i.e., that were intentionally omitted as mentioned above) and predict the 2D image positions in their respective cameras. The predicted image position can be compared to the actual measured image position: if the distance between the predicted image position and the actual measured image position exceeds a predetermined, user-specified distance tolerance, then the system can generate an appropriate warning or other notification. Alternatively, or in addition, the extrapolated 3D positions of the omitted features can be compared against 3D positions determined by triangulation. Note, where the distance between extrapolated (predicted) and actual positions differ, an appropriate warning or other notification can be generated by the system.

In order to improve the speed of feature recognition, during both training and runtime phases, the system can use the found position of one feature to limit the search degrees of freedom for the other feature. For example, if a first camera assembly finds the feature at 15 degrees, and another camera assembly is approximately in the same orientation as the first camera (but a different position with respect to the scene), then it may only need to look for the feature at orientations 15±10 degrees. In addition, given the origin's position from one camera, it is known that the origin will lie along a 3D ray; thereby, that ray is projected onto the second camera's field of view, and the feature is searched-for only along that line. If two features are confusable (i.e., there are two instances similar to the feature in the camera's field of view), the system can try all of the different possible correspondences.

It is expressly contemplated that the image feature information from at least one non-perspective camera can be employed in combination with the above-described techniques to enhance the determination of 3D pose of an object based upon predetermined feature poses associated therewith. It should also be clear that the above-described example, is one of a variety of techniques for determining 3D position of corresponding feature points. An exemplary programmatic expression for the principles described above is shown in further detail in the above-incorporated published U.S. Patent Application No. 2007/0081714 A1, entitled METHODS AND APPARATUS FOR PRACTICAL 3D VISION SYSTEM, by way of useful background. As such, a variety of techniques, including but not limited to the various techniques described above, can be employed to determine pose of an object given the position(s) of one or more features in each image of an object acquired by a plurality of perspective and non-perspective cameras in a system.

As described above, and according to an illustrative embodiment, the system and method herein determines 3D pose of an object by computing the correspondence between at least one non-perspective camera and one or more perspective cameras. The cameras are arranged to image a scene containing one or more objects. A plurality of cameras each respectively have a lens, and at least one lens on at least one of the cameras (respectively) is a non-perspective lens. This non-perspective lens can be a telecentric lens or another type that enables acquisition of a non-perspective image of the object. Each of the cameras is oriented with a field of view so as to contemporaneously acquire an image of the object, and at a known position with respect to the field of view. At least one of the images is captured using at least one non-perspective lens so that one of the images subsequently processed by the system and method is a non-perspective image. A search process, which can comprise hardware and/or software operating on processing hardware, is operatively connected to the cameras and searches for 2D feature points in each of the acquired images including the non-perspective image(s). When the search is complete, an association process associates the 2D feature points with known 3D model points ("association process" being defined as hardware and/or software operating on processing hardware that performs the point-association function). Then, a pose determination process computes the 3D pose based upon the 2D feature points and known 3D model points ("pose determination process" being defined as hardware and/or software operating on processing hardware that performs the computation of 3D pose by any of a variety of appropriate techniques contemplated herein).

VI. Affine Transform of Non-Perspective Camera Images

In the case of a plurality of non-perspective camera assemblies, typically imaging planar objects of interest that have substantially planar surfaces, the illustrative system can use techniques that avoid certain inaccuracies and processing overhead issues encountered in triangulation and various feature correspondence techniques.

Single telecentric camera-based vision systems have been utilized in the past. However, such systems lack the capability to compute the 3D pose of object of interest, therefore, the distance of the object of interest can not be determined. Multiple cameras based 3D vision systems as contemplated herein make it possible to fully determine the 3D pose of the object, but there is a fundamental issue of finding correspondences among multiple cameras in order to compute 3D positions of the feature points of interest. It is recognized that affine transformation between features on images is a widely used technique in vision system implementations. Applications of affine transformation in machine vision include (but are not limited to) (a) camera system calibration (See Rova, M., *Affine Multi-view Modeling for Close Range Object Measurement*, Doctoral thesis, University College London, 2010); (b) aerial/satellite image geometrical correction and integration (See Li, R, et al., *Geometric Integration of Aerial and High-Resolution Satellite Imagery and Application in Shoreline Mapping*, Marine Geodesy, Volume 31, Issue 3 Jul. 2008, pages 143-159); and (c) image matching/registration including (i) estimating affine transform to find scale change and compute optical flow (See Manmatha, R., *Image Matching Under Affine Transformation*, The 27$^{th}$ Asilomar Conference on Signals, Systems and Computers, 1993. Vol. 1, pages 106-110) and (ii) estimating affine deformation and intensity transformation (See Kovalsky, S. Z, et al., *Decoupled Linear Estimation of Affine Geometric Deformations and Nonlinear Intensity Transformations of Images*, PAMI(32), No. 5, May 2010, pp. 940-946).

By way of background, affine transformation is a linear transformation plus a translation, which preserves the collinearity relationship between points, and carries parallel lines into parallel lines. In photogrammetry, affine transformation is used to model film distortion. A matrix representation of affine transformation is as follows:

$$\begin{bmatrix} y \\ 1 \end{bmatrix} = \begin{bmatrix} A & b \\ 0, \ldots, 0 & 1 \end{bmatrix} \begin{bmatrix} x \\ 1 \end{bmatrix}$$

which is equivalent to y=A*x+b;
where A is matrix used for linear transformation, while b is a translation vector, x is the original vector, and y is the transformed vector.

As described above, since the images acquired by telecentric cameras do not show perspective distortion, and moving the object relative to the camera lens does not change imaged object's size, they can be modeled as affine cameras. According to an illustrative embodiment, the system transforms particular model(s) of interest at training time. These transformed models are then employed in runtime to search for features without the need to transform the run-time images.

Figure 7:
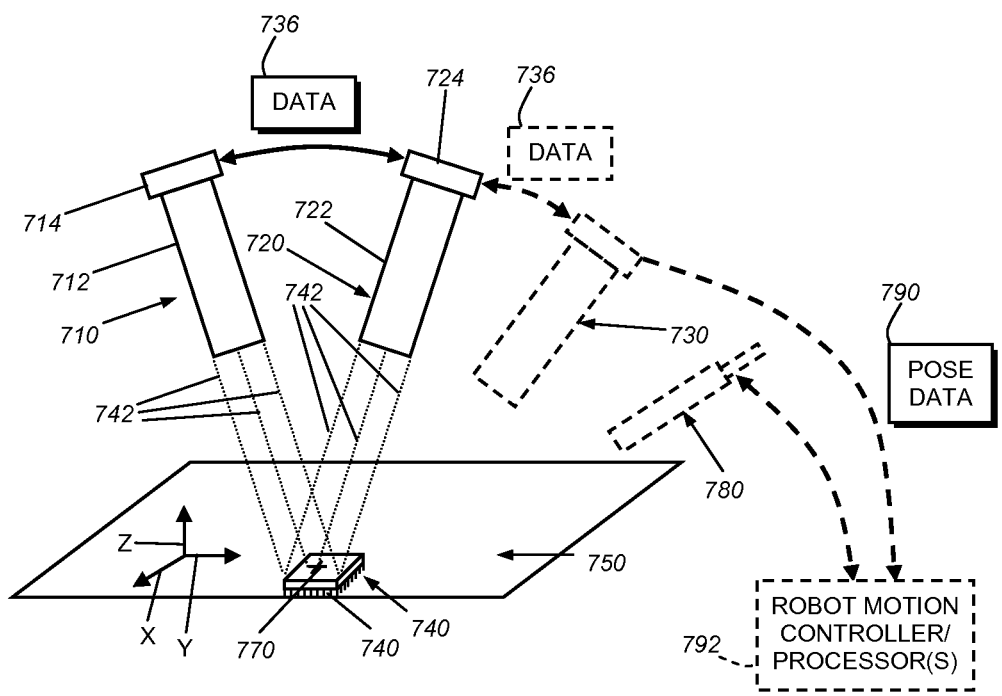
FIG. 7 is a diagram of a 3D vision system having plurality of non-perspective (e.g. telecentric) camera assemblies oriented around a scene containing a training object.

Reference is made to FIG. 7, which shows an exemplary arrangement of at least two camera assemblies 710 and 720, each consisting of respective non-perspective (e.g. telecentric) lenses 712 and 722, mounted on cameras 714 and 724 having processors, sensors and other components as described above. While not shown, an external processor and/or interface device (for example, computer 350) can be interconnected to one or more of the camera assemblies to carry out various functions and processes during training time and/or runtime. A third camera assembly (or more), represented by the camera assembly 730 can also be interconnected to the system. The camera's transfer various data 736, including multi-camera calibration parameters and search results, through wired or wireless links that interconnect camera processors and associated memories. Each camera assembly 710, 720, 730 is oriented to image the scene 740 via parallel rays 742 as shown. In summary, the system of this embodiment is constructed and arranged to compute the affine transformation among multi-telecentric camera system based on the multi-camera calibration information (including the camera intrinsic parameters and extrinsic parameters), and finding corresponding features among multiple non-perspective cameras in a significantly more accurate and efficient way.

Figure 8:
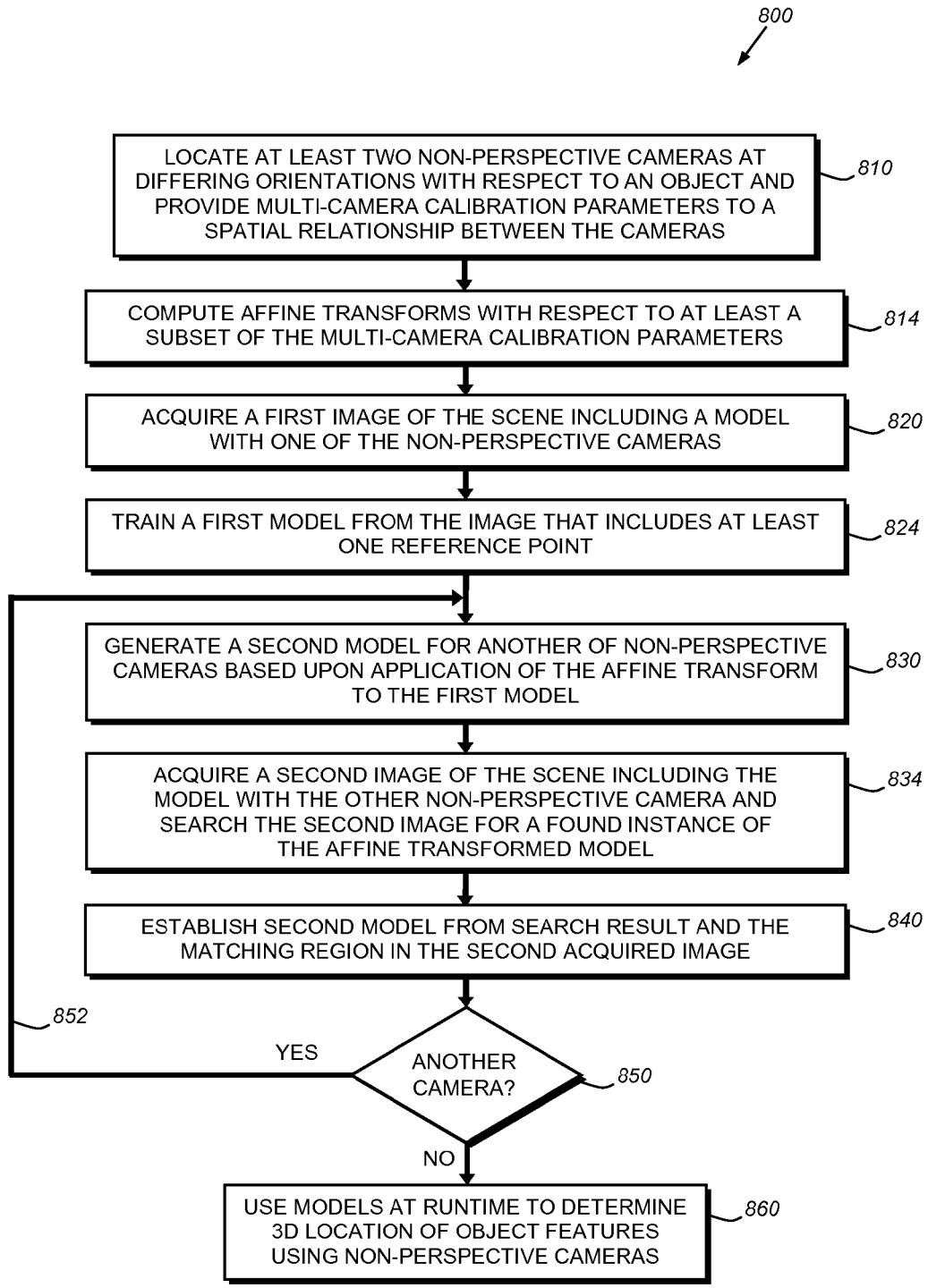
FIG. 8 is a flow diagram of an illustrative procedure for training of models with respect to a plurality of non-perspective cameras, and subsequent runtime use of trained models for use with the system of FIG. 7.

With reference now to the flow diagram of FIG. 8, a procedure 800 for training a plurality of non-perspective cameras is described in further detail. According to an embodiment, in step 810 at least two non-perspective cameras are located as shown in FIG. 7, at a plurality of discrete, differing spatial orientations with respect to the scene. Each camera has a discrete set of intrinsics and extrinsics that collectively provide the multi-camera calibration parameters. The intrinsics and extrinsics are obtained in a prior step (not shown) as described above. By way of example, a vision system calibration tool can be employed, such as the multi-camera calibration wizard available from Cognex Corporation. In general, a transform from the first camera's 3D point of view (3D space 1) to a second or subsequent camera's 3D space (3D space 2-N) can be obtained from multi-camera calibration results.

In step 814, the system computes an affine transformation between an image acquired by the first camera (714) and an image acquired by another of the cameras (724) using the parallel rays 742 of the respective non-perspective lenses 712 and 722 of these cameras and the associated intersection of these rays with the worldPlane. In an illustrative embodiment, the affine transform represents at least a subset of both the intrinsic parameters (defined by Raw2DFromCamera2D) and the extrinsic camera parameters (defined by Camera3D1FromCamera3D2). By way of example a sub-process for computing an affine transform in the case of two telecentric camera system is as follows.

Assume that both non-perspective camera assemblies 710, 720 can image a plane (that can be termed "worldPlane") 750 in FIG. 7, which provides the scene 740 in which an object of interest is to be located. The plane's (750) relative pose and position to the cameras are known. In an embodiment a commercially available calibration tool, such as the Cognex 3D calibration tool can be used in conjunction with a Cognex checkerboard calibration plate at the scene. In such a case, the xy plane of the world coordinate system (x, y, z) determined from camera calibration can be used as the worldPlane, and its relative pose and position to each camera can be obtained from the camera calibration result. The image plane from camera 1 (710) (the first camera) is termed "imagePlane1", and image plane from camera 2 (720) (the other camera) is termed "imagePlane2". Assuming that the object is on the worldPlane, then the affine transform between the projected object on imagePlane1 and the projected object on imagePlane2 can be computed via the worldPlane. In particular, the affine transform from imagePlane1 to the worldPlane can be computed by using the intersection points of the corner points of imagePlane1 to the worldPlane. More particularly, this computation can be accomplished in an embodiment using commercially available 3D vision system tools (from Cognex Corporation, for example) to compute image points' intersection with a 3D plane). The affine transform matrix is then obtained by mapping the image points to the intersection point. Similarly, the image points on imagePlane2 and their corresponding intersection points on the worldPlane can be used to compute the affine transform between the worldPlane and imagePlane2. It follows that the affine transform between imagePlane1 and imagePlane2 is the combination of two affine transforms, i.e. transform between imagePlane1 and the worldPlane, and transform between the worldPlane and imagePlane2.

In another embodiment, the affine transform between imagePlane1 and imagePlane2 can be computed by using the image feature points on imagePlane1 and their corresponding image feature points on imagePlane2. This entails projecting image feature points from imagePlane1 onto the worldPlane to derive 3D physical points, and then computing their corresponding image points on imagePlane2. This can be accomplished, by way of example, by using a 3D vision system tool to compute the image points from 3D physical points using the camera calibration parameters.

The following equation shows an illustrative 2D affine transform. Since the 2D affine transform has six (6) parameters (four in A, and two in b), each pair of corresponding points can provide two (2) equations, three (3) or more pairs of corresponding points are sufficient to estimate the affine transformation. For example, (x1, y1), (x2, y2) and (x3, y3) are three pairs of corresponding points used to estimate the transformation in the following equation:

$$\begin{bmatrix} y1 & y2 & y3 \\ 1 & 1 & 1 \end{bmatrix} = \begin{bmatrix} A & b \\ 0,\ldots,0 & 1 \end{bmatrix} \begin{bmatrix} x1 & x2 & x3 \\ 1 & 1 & 1 \end{bmatrix}$$

Next, in step 820 a model non-perspective image is acquired by the first camera assembly (710) relative to a model object 760, and system is thereby trained (step 824) for the image from the first camera, and models for other cameras can be obtained, by applying the corresponding affine transform on the first model. The model object 760 is in the field of view of all cameras 710, 720 (and 730, etc.), located on the worldPlane 750.

Figure 9:
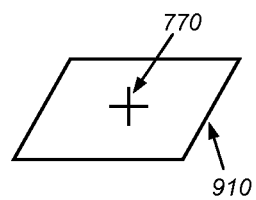
FIGS. 9 and 10 are, respectively, diagrams of exemplary training model images for use in the first camera and the second camera of the system of FIG. 7 in which the second training model is an affine transformation of the first training model.

More particularly, with reference to FIG. 9 and step 824, a 2D non-perspective image 910, of the object is shown with respect to the underlying worldPlane, as it is are acquired by the first camera assembly 710. The model includes at least one reference point (for example, a point or points in a searchable feature) 770. Its location is stored as part of the system's image data for the first training model.

In this example, the object is an electronic part with a variety of feature elements in the form of connectors, etc. An exemplary robot end effector 780 (shown in phantom) can be controlled to handle the object based upon the pose data 790 to be output from the system during runtime—this data being employed by a robot motion control and associated processor(s) 792 to guide movements of the end effector using conventional control techniques. In practice, the object can be any trainable item that has reference points and/or feature information. Likewise the pose data can be employed in any acceptable operation that would benefit by use of 3D pose information. More generally, the information/data related to object pose, acquired using one or more non-perspective cameras (either exclusively non-perspective or in combination with perspective cameras), can be provided to any process (device and/or procedure) that can perform an operation on the object—for example an electronic circuit pick-and-place device, a bolt-handling robot hand, a welding device, a cutter, etc.

Figure 10:
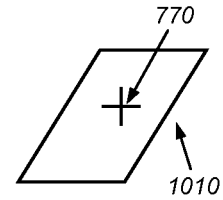

Notably, with reference to FIG. 10, the training model for the second camera assembly 720 (and any other camera assembly—730, etc.) is generated with the associated reference point(s) in its expected orientation by applying the affine transformation to the first model (step 830). Because it is assumed that the object plane is parallel to the worldPlane used in computing the affine transformation, then even if the object plane moves and is removed from the worldPlane, as long as these planes remain parallel, the affine transformations obtained in step 814 is still an accurate mapping of the model. In such a case, the translated object has a corresponding offset.

In step 834, the second model is used when an image is acquired by the second camera assembly 710 (and any other camera assembly 730, etc.) to search within that acquired image for a found instance of the reference point 770. Significantly, since the affine-transformed second (third, etc.) model should be already close to the instance in the corresponding image. It is noted that offset may be inaccurately predicted if the model object 760 is not located exactly on the worldPlane (as the object may define a predetermined height above the worldPlane). However, the overall process is more efficient because any subsequent search can employ limited degrees of freedoms in the second, and subsequent camera assemblies. Based upon this more-limited search, the second model is stored with respect to the second camera assembly. The process operates until all cameras have transformed an expected model and then established a useable model (via decision step 850 and procedure branch 852). When all models have been established, they are then available for use in determining the pose of runtime objects.

The resulting searched models should be more suitable for runtime searching since model contrasts and edge polarities are essentially similar to the corresponding search images. While it is expressly contemplated that the non-searched, initial affine transformed models can be used in an alternate embodiment as runtime models for the second and other camera assemblies, this may be less desirable in certain implementations. This is because the initial affine transformed models based on the trained model for the first camera may not have the same contrasts and edge polarities relative to the views of the corresponding images from the other cameras (due generally to viewing angle differences). Where the system employs the initial affine transformed models (i.e. omitting step 834), the system may desirably open the degree of freedoms and/or searching ranges during runtime so as to find the object's features in the images of other camera assemblies. In other words, the runtime search for trained features should typically be less limited when the initial affine transform models are employed without the refinement brought about by step 834.

Once the models for each camera have been established, then the system can switch to runtime mode and begin determination/computation of the 3D pose for runtime objects within the camera assemblies' collective field of view (step 860). More particularly, the system finds 2D features in each camera's image of the object using, for example a 2D search tool (also termed a "search process" that can comprise hardware processors and/or software instructions operating in conjunction with one or more hardware processes). One such search tool is the PatMax® application, which can be used to search for features/reference points at both training and runtime. The system then computes runtime object 3D pose information by using the multi-camera calibration parameters, and the feature correspondence information (e.g. the found reference points in runtime images) when running pattern/feature searches using the corresponding models. Any appropriate application can be employed to perform this computation including the 3D pose estimation tools commercially available from Cognex Corporation.

Significantly and stated alternatively, the above-described system and procedure 800 essentially allows for multi-camera applications in which the models used in each of the cameras, respectively, at runtime (step 860) are all descendants of a single training-time model defined in a first camera. Such a descendant model is herein defined as a model that is derived from the initial model using the first camera assembly's acquired image and features/reference points' locations as transformed by an appropriate affine transform based on at least a subset of the associated camera assemblies' intrinsics, extrinsics and the image from the associated camera assembly. One benefit of this approach is that benefit being the accuracy of the origins of all the models used at runtime. According to this approach, the runtime model for each of the cameras is used to find the location of at least one feature/reference point in the respective runtime image. 3D information is then computed based upon the multi-camera calibration parameters and the locations of the same feature(s)/reference point(s) in multiple runtime images from the multiple cameras.

According to an alternate embodiment, the procedure 800 can include a further step (not shown in FIG. 8) of correcting lens distortion. This can include warping the acquired images before training, according to a predetermined relationship (for example linear distortion), and then removing the lens distortion during a run of the search so as to further improve the search accuracy, i.e. the affine transformation is applied on the distortion-corrected images. An appropriate software and/or hardware (including optical) distortion and software and/or hardware non-distortion process can be employed to carry out these functions.

According to another alternate embodiment, the system procedure can employ a plurality of worldPlane coordinate values (a plurality of worldPlane versions) to compute multiple affine transformations for use in transforming the model between each pair of cameras. For example, if the object of interest has multiple parts, and each part is on a different plane, then the appropriate affine transform (associated with a particular version of the worldPlane) can be used for each part of the overall object.

Figure 11:
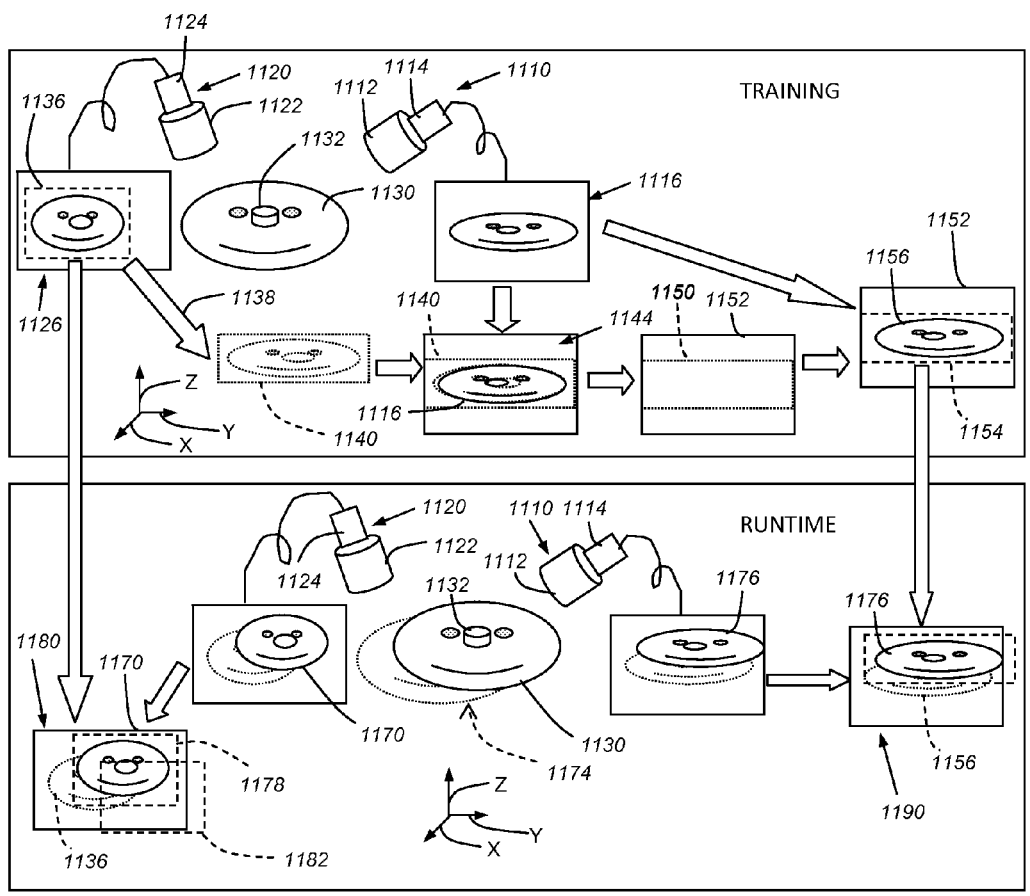
FIG. 11 is a diagram graphically depicting a system and method for training and subsequent runtime pose determination of objects using a plurality of non-perspective camera assemblies according to an illustrative embodiment.

Reference is now made to FIG. 11, which shows an overall system and method for training and subsequent runtime determination of object pose according to an illustrative embodiment. As shown, an exemplary arrangement of a plurality of camera assemblies is provided with each camera assembly 1110, 1120 from a differing point of location and orientation. Each camera assembly 1110 and 1120 includes a respective camera 1114 and 1124 and corresponding non-perspective lenses 1112 and 1122. The lenses are not necessarily drawn to scale. During training time an object (i.e. a training object) 1130 having planar surfaces with various features, some of which are elevated in the z-direction (e.g. surface 1132) is within the field of view of each camera assembly 1110, 1120. As shown, in training, the first camera assembly 1120 acquired an image 1126 of the object 1130. Contemporaneously, the second camera 1110 acquires a respective image 1116 of the object 1130. Each of these images 1126, 1116 can be considered a training image, and each is free of perspective distortion based upon respective lenses 1122 and 1112. A user or automated process selects at least one subwindow 1136 in the first training image 1126 to train a pattern of the object. The subwindow can be the entire object 1130, as shown, or a portion of the object with one or more features. Likewise, a plurality of subwindows can be defined around different features and/or groupings of features. The subwindowed first image (pattern) 1136 is transformed (arrow 1138) by the predetermined affine transform (established during camera calibration, described above) into an affine-transformed pattern 1140. The affine-transformed pattern 1140 is then registered into the second acquired image 1116 as shown by the graphical overlay 1144 containing both the pattern and image. This registration is then employed by the system to find an instance of the object within a limited search range defined by the affine-transformed pattern 1140. The found locale of the affine-transformed pattern is shown as the region 1150 in the overall second image field 1152. The size, shape and features of this locale are highly variable in alternate implementations. As shown by the graphical representation 1152, the found locale is used to select the limited search window/region 1154 for use in training the second pattern 1156. The patterns 1136 and 1156 are each respective models for each camera assembly 1120 and 1110, for use in runtime. As noted the above-described process used to train the second camera assembly 1110 can be employed to train another non-perspective camera assembly (i.e. a third camera assembly, a fourth camera assembly, etc.) located at another orientation with respect to the scene.

At runtime, the first camera assembly acquires a first (runtime) image 1170 of an object 1130 at a location in the scene that is typically different from the object's location 1174 (and orientation) at training time. The second camera assembly (and any additional camera assembly) also contemporaneously acquires a second (runtime) image 1176 of the object 1130, which tends to differ from the expected training time location (and orientation). As depicted in the overlay 1180, the model/pattern (or models) 1136 is registered in the first image 1170. A subwindow 1178 shows the registration (by the vision system tool) of the runtime image with the trained model. When the object features partially fall outside the image (symbolized by partially offset subwindow 1182), conventional applications of the vision system tool (for example those residing in PatMax®) can be employed to register the pattern. Likewise, the second image 1176 is registered (by the vision system tool) with the second training model/pattern 1156 as shown in the overlay 1190. The results of each registration include 2D position data that allows for determination of 3D pose as described variously above.

Note it is expressly contemplated that processes that employ the trained model may only employ portions of the overall data and parameters contained in the full trained model data. That is, the trained model data can contain a variety of feature data, edge information and other relevant data. A process herein may only require some of this data to perform a task. Thus, the termed "trained model" should be taken broadly to include all trained model data or an appropriate portion/sunset of that data. Likewise, even when a process completes a registration (or other) task without need to operate on all the appropriate data in the trained model, that process is considered to have employed the "trained model" in carrying out its task. Such shortcuts to using all available model data can be employed to optimize performance of the systems and methods herein.

It should be clear that the inclusion of at least one non-perspective camera assembly advantageously enhances the speed and accuracy of both training and runtime operation in a 3D vision system implementation. Moreover, the use of a plurality of such cameras makes possible increased efficiencies in establishing training models in multiple cameras and during runtime 3D pose determination. It should be further clear that the various embodiments described above can be variously implemented in a robotic environment with an object under manufacture in the microscopic or near-microscopic size range as described herein. In addition, the microscopic and near-microscopic aspects of the size are related to features being imaged—for example the overall object can be larger, but the portion being tracked and aligned is in the microscopic or near-microscopic size range overall.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. It is expressly contemplated that a plurality of objects can be presented in a scene during training and/or runtime and each of the plurality of objects can be trained as models and/or searched during runtime so that the respective pose of each of a plurality of objects are determined contemporaneously. Also, as used herein, the term "process" can refer to a structural hardware unit and/or software application that performs various vision system operations. For example, a "process" can be a unit or functional block (i.e. a structure) of another device that performs various vision system procedure steps. Accordingly, any of the processes or procedures herein (or parts thereof) can be implemented using electronic hardware, software (comprising a recorded or non-transitory computer-readable (processor-readable) medium of program instructions), or a combination of hardware and software. In addition, where an object is manipulated through a field of view of each camera in the vision system arrangement, the manipulator can be any acceptable conveyance that can be controlled in one or more degrees of freedom based upon visual feedback from the vision system including, but not limited to, a robotic manipulator arm, a motion stage, a conveyor, and the like. Accordingly, this description is meant to be taken only by way of example, and not to otherwise limit the scope of this invention.

What is claimed is:

1. A vision system that determines 3D pose of an object under manufacture having a size in the microscopic or near-microscopic range comprising:

a plurality of cameras in which a lens of at least one of the cameras is optically connected to a non-perspective microscope lens to acquire a non-perspective image, the cameras being respectively oriented with a discrete field of view so as to contemporaneously acquire a plurality of images of the object, respectively, at a known position with respect to the field of view;

a search process, operatively connected to the cameras, that searches for 2D feature points in at least some of the acquired images, including the non-perspective image;

an association process that associates the 2D feature points with known 3D model points;

a pose determination process that computes the 3D pose based upon the 2D feature points and known 3D model points; and a manipulator control that moves the object to a predetermined location based upon the determined 3D pose.

2. The vision system as set forth in claim 1 wherein each of the cameras is a non-perspective camera with a respective non-perspective lens.

3. The vision system as set forth in claim 2 wherein the non-perspective lens for at least one of the cameras is a telecentric lens.

4. The vision system as set forth in claim 2 wherein the lens for a first camera of the plurality of cameras is a non-perspective lens and the lens for a second camera of the plurality of cameras is a non-perspective lens, and further comprising a trained model for use by the second camera to search for the 2D features, the trained model being based upon an affine transform of a first model with at least one reference point in the image acquired by the first camera.

5. The vision system as set forth in claim 4 wherein the affine transform is based upon at least a subset of intrinsics and extrinsics of the first camera and the second camera.

6. The vision system as set forth in claim 5 wherein the search process is constructed and arranged to acquire a second image with the second camera and to search for 2D features in the second image within a predetermined range based upon the trained model.

7. The vision system as set forth in claim 1 wherein the device is a robot manipulator that moves the object from a source location to a receiving location in which the object is assembled to another component.

8. The vision system as set forth in claim 1 wherein the pose determination process includes a triangulation process based upon light rays extending between respective of the cameras and feature points on the object.

9. The vision system as set forth in claim 8 wherein the triangulation process is constructed and arranged to employ least squares fit to determine points of intersection of the light rays.

10. A method for determining 3D pose of an object under manufacture having a size in the microscopic or near-microscopic range comprising the steps of:

locating a plurality of cameras wherein a lens of at least one of the cameras optically connected to a non-perspective microscope lens, the cameras being respectively oriented with a discrete field of view so as to contemporaneously acquire a plurality of images of the object at a known position with respect to the field of view, including at least one non-perspective image;

searching for 2D feature points in at least some of the images of the plurality of images including the non-perspective image;

associating the 2D feature points with known 3D model points;

computing the 3D pose based upon the 2D feature points and known 3D model points; and moving the object to a predetermined location with a manipulator based upon the computed 3D pose.

11. The method as set forth in claim 10 wherein the non-perspective lenses is a telecentric lens.

12. The method as set forth in claim 10 wherein the lens for a first camera of the plurality of cameras is a non-perspective lens and the lens for a second camera of the plurality of cameras is a non-perspective lens, and further comprising searching for 2D features with the second camera using a trained model, the trained model being based upon an affine transform of a first model with at least one reference point in the image acquired by the first camera.

13. The method as set forth in claim 10 further comprising computing the affine transform based upon at least a subset of intrinsics and extrinsics of the first camera and the second camera.

14. The method as set forth in claim 13 further comprising acquiring a second image with the second camera and searching for 2D features in the second image within a predetermined range based upon the trained model.

15. The method as set forth in claim 10 wherein the step of moving comprises moving the object with a robot manipulator from a pick location to a place location having another component, and assembling the object to the other component.

16. A system for guiding a manipulator that releasably holds an object sized in the microscopic or near-microscopic range comprising:

a plurality of cameras in which at least one of the cameras is optically connected to a non-perspective microscope lens to acquire a non-perspective image, the cameras being respectively oriented with a discrete field of view so as to contemporaneously acquire a plurality of images of the object in a location in which the object is undergoing a manufacturing task, respectively, at an alignment location with respect to the field of view;

a search process, operatively connected to the cameras, that searches for 2D feature points in at least some of the acquired images, including the non-perspective image;

an association process that associates the 2D feature points with known 3D model points;

a pose determination process that computes the 3D pose based upon the 2D feature points and known 3D model points; and a manipulator control that moves the manipulator to locate the object at the alignment location based upon the determined 3D pose.

* * * * *